(12) United States Patent
Johnson

(10) Patent No.: US 9,128,668 B2
(45) Date of Patent: Sep. 8, 2015

(54) MULTIPLE SUCTION CUP ATTACHMENT PLATFORM: SECURING AN ELECTRONIC DEVICE ON A VERTICAL SURFACE

(71) Applicant: August A. Johnson, Boise, ID (US)

(72) Inventor: August A. Johnson, Boise, ID (US)

( * ) Notice: Subject to any disclaimer, the term of this patent is extended or adjusted under 35 U.S.C. 154(b) by 177 days.

(21) Appl. No.: 14/023,779

(22) Filed: Sep. 11, 2013

(65) Prior Publication Data

US 2015/0070839 A1    Mar. 12, 2015

(51) Int. Cl.
*G06F 1/16* (2006.01)
*B60R 11/00* (2006.01)
*F16M 11/00* (2006.01)

(52) U.S. Cl.
CPC .............. *G06F 1/1626* (2013.01); *B60R 11/00* (2013.01); *F16M 11/00* (2013.01)

(58) Field of Classification Search
USPC .......... 235/492, 375, 494; 248/450, 460, 126, 248/205.6, 688, 309.1, 295.11, 206.2, 248/205.5, 224.8; 361/679.56, 679.02, 361/679.21, 679.39, 679.55, 679.32, 361/679.33, 679.36, 679.34, 679.41, 361/679.46, 679.31, 679.35, 679.29, 361/679.37, 679.57, 679.08, 679.47, 361/679.48, 679.49; 455/575.8, 67.12, 457, 455/41.1; 312/223.1, 317.3, 319.1, 223.2, 312/265.4, 306, 222, 333, 334.8, 326

See application file for complete search history.

(56) References Cited

U.S. PATENT DOCUMENTS

| 6,767,318 B2 * | 7/2004 | Spatafora et al. | ............. 493/303 |
| 8,794,536 B2 * | 8/2014 | Johnson | ........................ 235/492 |
| 2013/0341412 A1 * | 12/2013 | Johnson | ........................ 235/492 |

* cited by examiner

*Primary Examiner* — Hung Duong
(74) *Attorney, Agent, or Firm* — Pedersen & Co.; Barbara Pedersen

(57) ABSTRACT

A mounting apparatus permits easy and quick attachment and removal of the apparatus securing a portable device to smooth surfaces, or objects. An injection molded platform which allows multiple suction cups to be attached to secure a portable electronic device such as a smart phone, cellular phone, tablet, e-reader, or other digital media device to a smooth surface, or object. The primary platform is an injection molded part specifically designed to accommodate the insertion of mini suction cups, small suction cups, and medium suction cups. The injection molded platform contains multiple openings specifically designed to allow the attachment of an array of suction cups, and alternative mechanisms including kickstand assembly, elastic straps or cording. It is a further object of the invention to provide a platform apparatus that can be attached to smooth surfaces for different sized devices with touch screen capabilities, and devices with camera and video functions.

27 Claims, 21 Drawing Sheets

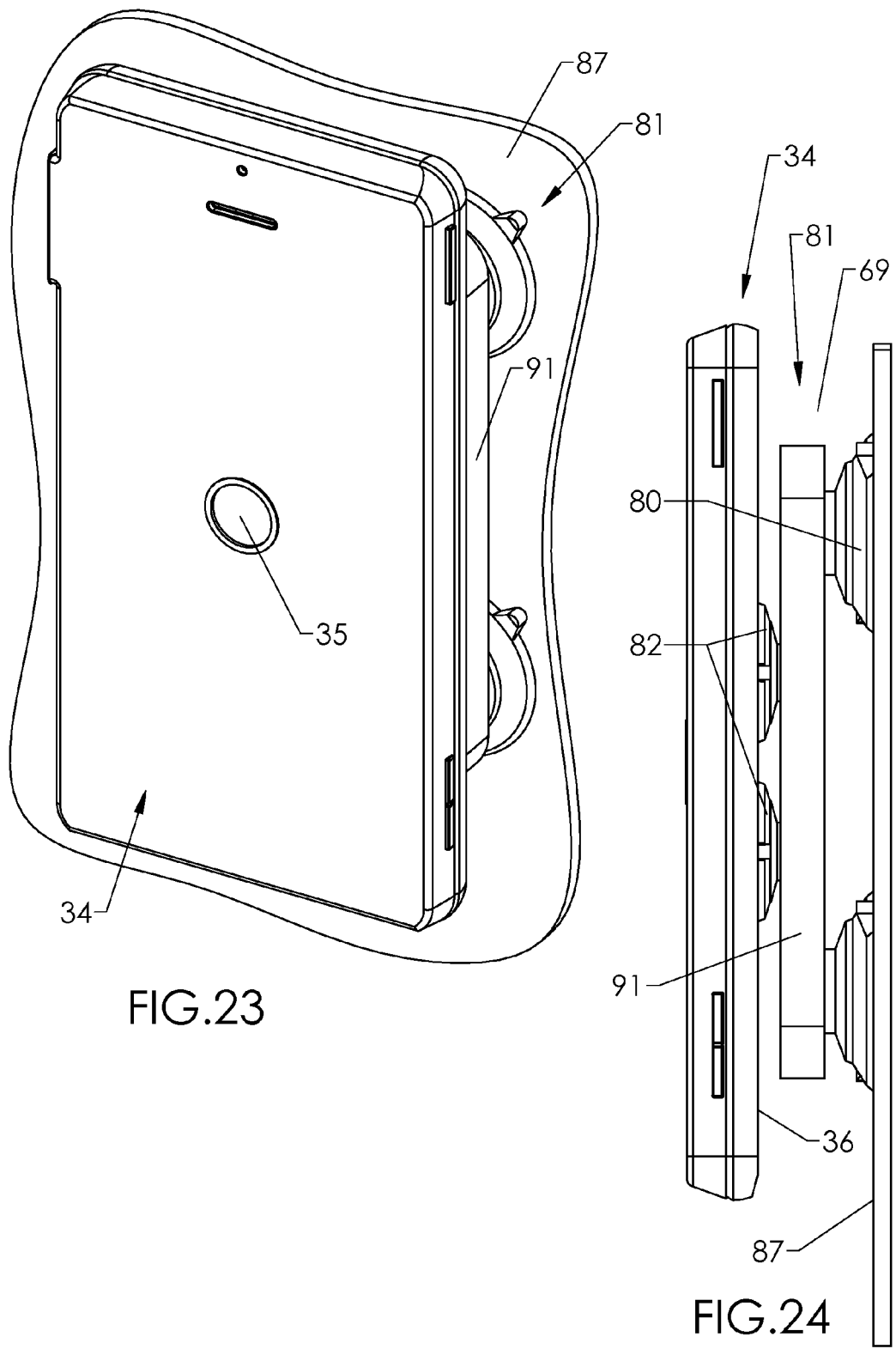

MULTIPLE SUCTION CUP ATTACHMENT PLATFORM: SECURING AN ELECTRONIC DEVICE ON A VERTICAL SURFACE

This application claims benefit of Provisional Application Ser. No. 61/701,049, filed Sep. 14, 2012 and entitled "Multiple Suction Cup Attachment Platform; Securing an electronic device on a vertical surface", the disclosure of which is incorporated by this reference.

BACKGROUND OF THE INVENTION

1. Field of the Invention

The present invention generally relates to a mounting accessory for electronic devices that have photo and video-recording capabilities. More specifically, the preferred embodiment is a mounting apparatus, for holding a portable electronic device, such as a cellular phone, smart phone, tablet, camera, e-reader, or other digital media devices, whereby the digital device may be connected to a surface or object preferably via suction cups, for hands-free use of the digital device. The invention relates to an apparatus that securely holds a portable electronic device on a smooth surface, vertical or horizontal. More particularly, the invention relates to apparatus securing a portable electronic device such as a smart phone, cellular phone, tablet, e-reader, or other digital media device which is held securely thereupon securable to a smooth support surface or smooth object, or non-smooth objects.

2. Related Art

There are many electronic device holders, mounts, and attachment solution designs in the prior art. Still, there is an absence of a multi-purpose apparatus that may serve as an attachment system that is operable with nearly all photo-capable cellular/smartphone designs as well as tablets and e-readers. To the applicant's knowledge, there has not yet been disclosed a multi-functional platform with interchangeable suction cups, that can hold a photo-capable cellular/smartphone in the desired methods for taking hands-free pictures and video, also having capability for hands free screen viewing.

With the development of information communication technology, cellular phones have become essential tools modern life. More recently, the cellular phone is provided with various functions, such as a camera, in addition to a function of simply calling or answering the telephone. The integrated camera has a variety of functions including photo and video recording. In addition, various smartphones and tablets have applications (known as "Apps") that allow a user to take photos using self-timers. These self-timers can be initiated either utilizing a preset time, motion sensor, or can be initiated by sound, such as a clapping noise or voice command. Alternatively, blue tooth enabled remote controls are becoming available to allow users to remotely control the shutter function, thereby providing more control when taking self-photos which is seemingly superior to alternative timer applications. Regardless, either format could be utilized for taking photos. Designs widely vary, however nearly all modern day smartphones, e-readers, and tablets include a flat LCD touch screen, which the inventor has discovered can serve as a location at which to attach small suction cups. Additionally, many of these hard shell casings of such smartphones, tablets and e-readers comprise a smooth hard surface, which can therefore act as an additional attachment location for multiple suction cups, to allow screen viewing. Thus, the cellular phone and tablets are recognized as advanced video-recording equipment, going beyond the functionality of a traditional camera used solely for picture taking purposes.

With the advancement of cell phone and tablet technology and increasing demand for photo and video functionality, the inventor believes that there is a need for a multi-purpose, convenient, and inexpensive mounting apparatus that allows for hands-free pictures/video, and that is operational with a wide variety of electronic devices. There is a need for such a mounting apparatus that uses an easy-to-use and long-lived mounting mechanism, such as the preferred suction cups, that is operable with most present day smartphones, tablets, e-readers, and other similar electronic devices. This invention addresses these needs.

SUMMARY

The present invention comprises a mounting apparatus comprising an injection molded platform as a generally-planar platform having interchangeable connection mechanisms on both sides of the platform. The connection mechanism on one side may connect to an electronic digital device (screen or back side) and the connection on the other side may connect to a generally vertical or other surface or object to which it is desirable to connect the digital device for hands-free camera or video recording. In certain embodiments, the connection mechanisms are suction cups of variable sizes that are secured to the platform, and in other preferred embodiments, alternative connection mechanisms can be employed including but not limited to; elastic straps, cording, and screws. The rigid platform optionally includes an attachable/detachable kickstand, which attaches in multiple configurations.

In certain embodiments, the multiple-cup suction cup units are attached to the platform by extending through side pilot holes onto posts, wherein the size and/or shape of each hole relative to the appropriate post/axle of its respective suction cup unit allows installation of the suction cup unit but also securely retains the suction cup unit during use. With at least one, and preferably multiple, suction cups thus-provided on each side of the card-platform, the preferred mounting apparatus is adapted to removably capture/hold a portable electronic device and suspend it from a smooth surface or object, for example, to retain the electronic device in a desirable position during use as a camera or video recorder. Certain embodiments are adapted to hold the electronic device in a horizontal/landscape orientation, although the platform and/or the digital device may be rotated by 90 degrees to place the electronic device in a portrait orientation.

In certain embodiments, the cups at the rear of the card are preferably larger, intended to suction to smooth vertical surfaces. The cups at the front of the platform are intended to be smaller in size, and intended to attach to an electronic device either on the touch screen or at the back of the device if the surface is sufficiently smooth to provide suction and strength differential as preferred. The varying sized suction cupping mechanisms contain either a side pilot hole design or thick-neck mushroom head design. The primary platform is an injection molded part specifically designed to accommodate the insertion of mini suction cups with thick neck mushroom head, small suction cup with side pilot hole, medium suction cup with side pilot hole, or large suction cup with side pilot hole. The side pilot hole dimensions are identical on all three sizes of cups, thereby allowing any of the varying sizes to operation effectively within the appropriate suction cup slot/post. These varying sized cups can be inserted into slots at various locations on the platform on uniquely designed slots/ports to purposely keep the suction cups in place. Due to the different sizes of cups, the slot designs vary. The openings within the platform card at which the suction cups can be inserted will be referred to as "Suction Cup Slots". The suction cups with side pilot holes insert into slot openings, each containing an extending post which extends into and through the side pilot hole portion of the suction cup. The location of slots for the suction cup allows them to be interchanged to accommodate devices of varying sizes. For example smaller cups can be used at the center of the platform for smaller devices that have smaller screen sizes. These smaller cups can then be removed and inserted at the suction cup slots on the outer edges of the platform to accommodate use with larger devices. The total number of suction cups used can vary depending on the size and weight of the device.

In certain embodiments, the present invention is designed to accommodate a wide spectrum of attachment methods, allowing for functional uses including the following but not limited to: Hands free screen viewing while attached to smooth vertical surfaces (device must have a smooth finish on the back of the device to provide sufficient suction); Hands free pictures and video capture while platform attached to a smooth surface (if the device allows) and the front of the platform is suctioned to the touch screen of the device; Hands free screen viewing using the detachable kickstand (portrait or landscape); Hands free screen viewing using the detachable adjustment cord and kickstand in combination (portrait or landscape) suspended from surfaces or objects; Hands free screen viewing while the platform is screwed to a non-smooth surface (small circular openings act as holes for screws) (device must have a smooth finish on the back of the device to provide sufficient suction). The device can be generally oriented in two ways on the mounting platform; with the camera exposed for pictures/video, or with the screen exposed for viewing. The second orientation is beneficial for a number of operations such as email, internet, videos, browsing, reading, etc.

The kickstand has been designed to allow for independent functions besides the attachable kickstand function simply. The kickstand is designed with slots at which to attach extra suction cups while not in use. The design allows the kickstand to be snapped onto the platform at four different locations. The kickstand is designed in a triangular shape with three different angles which then allows for varying view angles when implementing the kickstand for use. This attachable/detachable design provides flexibility in use with the platform. The kickstand is created of two component parts, which are attached by a metal pin, allowing for rotation of the central kickstand arm around a central axis, allowing varying angles. The adjustable legs of the kickstand contain snap openings at each end, allowing the kickstand to be snapped onto the larger platform mechanism, either while is use as a kickstand, or in a folded position for storage purposes while not in use at the rear of the platform. These slot openings will be referred to as snap slot openings associated with the kickstand, or alternative attachments. The platform is purposefully designed to allow the kickstand to be attached at the rear for storage purposes, but still retain the functionality of attached suction cups at the rear of the platform to allow for attachment to a smooth surface.

The four kickstand snap slot openings and round peg/post arms integrated into the platform design provide additional functionality above and beyond use of the kickstand simply. These four snap slots are aligned to be directly opposite each other, with one slot on each of the four sides of the platform mount. These snap slot openings and post arms are also designed to be used with properly sized elastic straps, 1 to 1.5 inches in width that can be easily inserted into the slots. The connections (also called "insertion points" due to loops of the strap being inserted between arms of their respective arm-systems) between the mounting plate and the ends of the elastic strap are designed to be strong to allow sufficient tension on the straps to provide a secure attachment around an object.

The proximal end of the preferred elastic strap comprises a loop that passes through the snap slot and around strap arms (four attachment location options for the strap). Note that arms extend toward each other, but do not meet, thus forming a gap between their inner ends for insertion of the loop of proximal end. This preferred slot/arm design is intended to allow quick and easy connection and disconnection of the strap to the mounting platform. Said connection and disconnection is performed, when desired, by manipulating the loop through the gap between the arm inner ends The elastic strap would incorporate a Velcro material which could then attach to the opposing strap, or strap around an object to allow the platform to be secured for use on alternative surfaces or objects other than something that is smooth. The In certain embodiments, the retention strap fastens in a tightened configuration by means of patch(es) of hook/loop fastener. The strap's elasticity, and the leeway in connection location provided by hook/loop fastener, allows the user to tighten the retention strap around/against an object to hold the platform securely in place on/against said object. The retention strap may connect to one portion of the mounting plate, and loop through the slot at the opposing side of the plate to form a space between the strap and the mount for receiving the object. After looping through said another slot opening, the retention strap may attach to itself in the tightened configuration for capturing the object. Alternatively, other fasteners and fastener locations for latching/securing the retention strap in a tightened configuration may be used, for example, hook-and-loop cooperating patches at other locations on the strap, or fastener(s) on the mounting plate that cooperate with a fastener(s) on the retention strap.

The platform mount design also includes slot openings at each corner that are designed for the optional insertion of a cord material. The slots are narrowly opened at the corners with larger openings at the interior to allow the cord to move freely within the slot, but ensure that it is retained within the slot during use. This cording material includes an adjustable cording locking mechanism that is spring loaded to allow the length of the cording to be adjusted depending on the intended use. Cord locks are a previously existing mechanism that is sold in a variety of styles, colors and sizes. The cording can therefore be inserted into the cord slots and either wrapped, tied, slung, or somehow attached to objects to allow the platform card to be secured. Examples include a head rest on a seat so that a person can use the invention in a vehicle, or airplane, etc. It is the intention of the cord slots to allow more flexibility in use of the present invention rather than simply be attached to smooth surfaces via suction cupping mechanisms.

The present invention is therefore designed with multiple slots for a variety of mechanisms. A brief summary of the slot types include, but are not limited to: Suction cup slots (side pilot hole), Cord slots at the corners of the platform, slots openings for elastic strap with hook/loop fastener, Snap-in-place Slots/posts for the kickstand (the same slots used for the strap option), mini suction cup slots for thick-neck mushroom head attachment, and finally, round slot openings for screws, i.e. attach to walls.

The particular configuration of the suction cups utilized is directly related to the preselected or identified electronics device for which it is to retain during use. As such, the invention disclosed herein is attempting to be a one-size-fits-all product, due to the fact that the suction cups can be reconfigured to accommodate any device and are generally interchangeable. The intention of the design is that the configurations will conform/fit "most" electronic tablets, e-readers and smartphone devices. As such, the actual dimensions of the suction cups used in conjunction with the invention may have to be changed out, or moved to other locations on the platform to accommodate different devices. Additionally, it should be noted that such electronic devices have varying locations of camera lenses integrated therein. As such, the present invention provides for multiple options to accommodate both centralized and side/corner locations of the camera lens. The present invention therefore is intended to incorporate varying camera lens locations into the multiple suction cups design in an attempt to conform/fit "most" devices that were previously identified for this concept.

Alternatively, the size of the platform can be modified, altered, or varied to accommodate the specific class of devices. For example, a smaller, less preferred version of the platform card can be created with multiple suction cup slots, however would not include the kickstand clipping slots or the cord slots. This modified design would therefore only work with smaller devices. In the following drawings, two differently sized platform versions are presented for demonstration purposes, which we have classified as "small" and "large". The present invention is not limited to a specific platform size or design, but rather a platform that incorporates one or more of the unique design features. This could include a combination of the previously outlined design features and is therefore not limited to a concept design that only incorporates all of them onto one platform design. As such, the invention allows for tremendous flexibility in platform size, integrated features, and relative functionality. In the following drawings two versions of the invention are presented, one of which incorporates all of the identified design features, and one with only the suction cup slot design features.

In certain embodiments, the mounting platform includes a single-layer of material, in which appropriately-sized slots and features and injection molded or otherwise provided to receive the suction cup units, with the resulting mounting apparatus featuring cups and being held together as a single unit during use. The platform dimensions are designed to allow an electronic device to be affixed via the suction cups to the LCD touch screen and securely held with the camera lens is exposed during use, such as picture taking and/or video taking. Alternatively, the suction cups may be attached to the back of an electronic device with smooth surface, to allow the touch screen to be facing forwards for viewing and use. The preferred mini thick-neck suction cup units are of a small enough size to allow multiple suction cup units to be inserted/affixed to the platform in a forward facing orientation. It is a further object of certain embodiments to provide a double-sided suction cup apparatus for differently-sized devices such as small tablets, and modern smartphone models with touch screen capability. The preferred suction cups have a holding strength rated for at least 1 pound (each), therefore, with the use of multiple cups, the holding power of the multiple-cup mount apparatus is sufficient in strength to suspend a wide range of devices from a smooth, vertical (including generally vertical) surface, or object. Additionally, the alternative attachment options allow the mount to be attached to other surfaces an objects which may/may not be smooth in finish.

It will further be seen that the inventor has provided herein an apparatus that secures an electronic device with a smooth surfaces for hands free use, which may not be produced and manufactured from pre-existing parts, as the platform is a unique injection molded component of the invention that is not currently available in the market place. The present invention utilizes suction cups which are readily available in the market, but such a unique combination has not previously been taught and the advantageous quality and unusual results obtained from such a combination has not previously been recognized or achieved.

While the following description details preferred embodiments, it will be understood that such detail need not be strictly adhered to, but that additional changes and modifications may suggest themselves to one skilled in the art, all falling within the scope of the invention as defined by the claims.

BRIEF DESCRIPTION OF THE DRAWINGS

The following description of the apparatus can be understood in light of the Figures, in which:

FIG. 23 is a front isometric view of the embodiment depicted in FIG. 21, but with the rigid mounting platform rotated by 90 degrees, while device is attached in a portrait orientation.

FIG. 24 is a side view of the embodiment depicted in FIG. 23.

DETAILED DESCRIPTION

Figure 1:
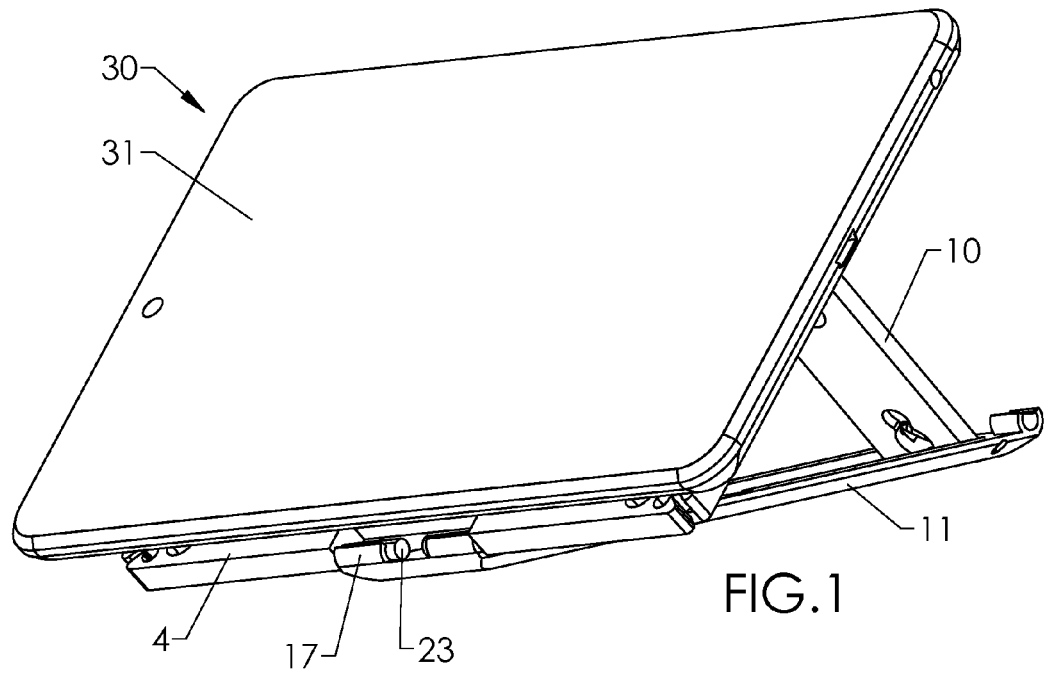
FIG. 1 is a front isometric view of one embodiment of the invented mounting apparatus, fully assembled with suction cups in place within the slots, wherein the figure identifies a preferred, but not the only, orientation of an electronic tablet device attached to the front of the platform with kickstand attached.

Referring to the figures, there are shown several, but not the only, embodiments of a mounting apparatus for securing an electronic device that preferably contains photo and video recording capabilities for capturing hands free pictures and video, or alternatively for suspending a device for hands free screen viewing in a variety of configurations. The preferred embodiment comprises a rigid platform mount with multiple suction cup attachment options, providing a broad array of combinations of suction cups, but other features may be included in certain embodiments of the invention. These additional features include an attachable kickstand, cording slots, screw hole slots, strap attachment arms/slots, all of which provide for enhanced functionality of the rigid platform, but are not all required to accomplish the primary task of suspending an electronic device from a smooth vertical surface. While the preferred embodiment would include all of the integrated design features, some less preferred embodiment could optionally include only one or more as required. Thus, the most simplified version of this rigid platform has also been described and shown herein, to demonstrate a less preferred embodiment that includes only four side pilot hole suction cup posts/slots and four mini suction cup slots. The number of slots can therefore be adjusted as required, but would include at least two or more of each suction cup slot design.

Certain embodiments of mounting apparatus comprising the rigid mounting platform and the attached kickstand are shown assembled and attached to one another while the integrated suction cups are attached to a device in FIGS. 1, 2, 4, 5, 11, and 14. An embodiment of the mounting apparatus is shown with the kickstand assembly attached with one or more cups in place, but no device shown, in FIGS. 3, 4, 7, 8 and 13, and an exploded view of the kickstand assembly and various suction cups in FIG. 9. Certain embodiments of the mounting apparatus are shown assembled and connected via strap or cording (both configurations shown simultaneously) to an object (head rest/seat back) in FIGS. 14, 15, and 17, and also a close up view of these aforementioned connection methods to the object in FIGS. 16 and 18. Alternative embodiments of the platform mount are shown with suction cups and attached electronic device while securely attached to a smooth vertical surface in FIGS. 10, 11, 19 and 20. The mounting apparatus is shown being optionally attached to a non-smooth surface via screw mechanism in FIG. 12. A less preferred version of the rigid platform is depicted with suction cups in place while attached to an electronic device in FIGS. 21-24, and showing only the rigid platform mount with attached suction cups in FIG. 25. An exploded view of the less preferred mounting platform and preferred suction cups are shown in FIG. 26. The less preferred version of the rigid mount platform is shown by itself in FIG. 27 as to provide a clear view of the preferred suction cup slot designs.

In certain embodiments, the mounting apparatus comprises: a first portion that comprises a rigid mount platform that is a molded part, wherein the first portion has a front side and a rear side opposite the front side, and various slots located within the platform for insertion of various sized suction cup units. The larger slot openings with posts are designed to secure suction cups with side pilot holes, allowing for the cup to be oriented towards the front of the mounting platform, or the rear. The thickness of the platform is designed to a thickness relative to the thickness of the knob of the suction cup, with the post located within the slot to allow the side pilot hole to be inserted onto the post, pushed through, and held in place via a small mushroom tip at the end of the retention post. The smaller circular slots are designed to allow attachment of mini suction cups with thick neck mushroom head design. The slots incorporate two partially overlapping circles, wherein the mushroom head is first extended into the larger circular hole opening and then pushed into the smaller slot region which is designed with a diameter slightly smaller than the diameter of the thick neck portion of the cup, thereby creating a tight fit between the rigid slots and the flexible cups. The thickness of the slot is designed to allow the rigid portion of the slot opening to extend into the gap between the mini suction cup and the mushroom head portion above the neck of the cup. This design creates a tight fit between the platform slot opening and the mushroom head, thereby keeping the cups in place when pulled outwards, in such an instance as being attached to the screen of an electronic device.

Optionally, a bi-fold kickstand assembly may be incorporated into the certain embodiments of the apparatus. A metal pin attaches the two legs of the kickstand, each leg including a circular snap feature(s) at the end of the kickstand legs, allowing the assembly to be snapped onto the larger mounting platform. The rigid mount platform includes multiple slot openings with circular pegs oriented in a fashion as to allow the circular ends of the kickstand assembly to be snapped onto the round pegs, also being easily removed, or unsnapped. Additionally, the kickstand can fold upon itself to create a more compact assembly, after which the kickstand can then be attached to the rear of the rigid platform mount while not in use. In the preferred use in certain embodiments of the invention, the kickstand can optionally be oriented in two different directions to provide an angled mount for an electronic tablet while resting on a horizontal surface. Alternatively, the kickstand assembly can be used in conjunction with the mounting platform while slung over, or attached via cording, to an object such as the back of a car seat for example. This alternative use allows for a device to be attached/mounted to an object for hands free screen viewing while attaining the desired view angle via the use of the kickstand assembly.

The rigid mounting platform can be used in conjunction with a variety of suction cup designs and sizes. As such, the suction cups used with the mounting platform may come in many shapes that may be incorporated into certain embodiments of the invention; it will understood from this disclosure that suction cup designs used in certain embodiments of the invention are manufactured by numerous suppliers, however more specialty suction cups can alternatively be used in order to be part of the assembly of the mounting apparatus.

The multiple functionality of certain embodiments of the invention, for example; kickstand attribute; strap attachment; cording attachment; screw attachment; plus the various suction cup mounting options allows for increased functionality of the apparatus being an accessory which can be used with a broad array of electronic devices. As such, it is possible that a person may elect use the device or hands free screen viewing while attached to the back of a device, or for use in taking self-photos or videos, both of which also allow for a high number of configuration options.

One side of the mounting apparatus is removably affixed/suction-cupped to the screen of an electronic device, allowing the other side of the mounting apparatus with attached suction cups (side pilot hole design) to be attached to a smooth surface/object in landscape orientation, that is, "held horizontally", or in a portrait orientation, "held vertically". By removably affixing/suction-cupping the mounting apparatus to the screen of the electronic device, the camera lens, which is on the side of the electronic device opposite the screen, remains exposed for use. Alternatively, the front facing suction cups at the front of the mount can be attached at the rear of an electronic device, which is often a smooth surface which will allow attachment of suction cups. Thus, devices can be attached via the screen of the device, or via the back side of the device, thereby allowing dual purpose use; taking hand free photos/video, or hands free screen viewing.

One type of electronic device for which the apparatus is intended include a camera feature with photo and/or video functionality, and a timer function or alternative shutter option that can be set prior to suspending the apparatus. For example, nearly any smartphone or tablet has the capability to download applications ("Apps") with upgraded camera shutter functions which allow a user to take self-photos. These camera shutter functions can be initiated either utilizing a preset time, or can be initiated by sound, such as a clapping noise or voice command. More enhanced shutter features also include time lapse photo features for taking multiple pictures over a period of time. For example, after a timer is set, the mounting apparatus is attached to the screen of the electronic device (leaving the camera lens exposed), and the still-exposed suction cup(s) of the mounting apparatus are then pressed onto a smooth surface to allow the user to walk away to pose for the photograph, effectively taking a self-photo/video or allowing the user to join group photos/videos. This suspension of the electronic device may be extremely useful for traveler(s) who want classic tourist-photos or group photos without asking a stranger to take the photos. This also may be extremely useful for road travelers who want photos of themselves and their companions in a scenic environment wherein there are no such "strangers" to hold the camera, wherein the present invention can be suspended from the exterior windows of a vehicle, or smooth panels. This method can also serve the day to day functions of smartphone/tablet owners that take self-photos, providing a simple alternative to directing the camera lens into a mirror in order to capture a self-photo.

Another type of electronic device for which the apparatus is intended include a touch screen feature to allow for internet usage, reading, video viewing, etc. Modern day tablets, e-readers, and smartphones are all designed with such capabilities, thereby allowing a combination of touch screen functionality and standard screen viewing. With such functions, a user may elect to mount the device to object, or set the device on a flat surface for hands free screen viewing. This is particularly evident while a user is simultaneously conducting other functions such as eating, cooking, or holding objects, thus restricting them from also safely holding the device. The invented apparatus is intended to provide a variety of options for such hands free screen use/viewing with such modern devices. Many, but not all devices contain smooth surfaces at the back side, allowing multiple suction cups to attach. Thus, such devices can be attached to the mounting platform via suction cups, preferably the small or medium sized side pilot hole style cups. The mount can thereby be attached to the back of the device while using the kickstand assembly and placed on a flat surface to allow hands free use in a variety of different view angles. These different view angles are achieved with the implementation of the kickstand due to the legs of the kickstand being different in length, thereby providing multiple attachment configurations and slopes/angles when attached to the platform mount.

The additional attachments include an elastic retention strap which can be secured around the circular pegs at opposing sides of the platform and then extended around an object such as the head rest of a passenger seat in a vehicle or airplane. This orientation allows hands free screen viewing for a user in a seating environment, often occurring during travel, which is typically an ideal time to use such devices. Alternatively, the mount can be used in conjunction with a cording material, which can optionally be slotted into the cording slots at any two of the four corners of the mounting platform. The cording material is preferably used in conjunction with a cord lock, so as to allow adjustability of the length of cord, and corresponding view angle for the user. And lastly, four small circular holes located at the interior of the platform, 1"-2" inches from each corner of the mount provide an opening at which to extend a screw mechanism, or similar device, to removably attach the mount to a non-smooth surface, for example a typical wall. This mounting orientation would likely include multiple suction cups attached at the front of the platform to allow a device to be attached thereto, providing a suspension location on a non-smooth surface for a variety of electronic devices. The uses in this orientation would include hands free pictures and video, or hands free screen use/viewing.

An object of certain embodiments is to produce/manufacture the mounting apparatus from a custom plastic injection mold rather than from pre-existing parts/materials. While the suction cups are readily available in the market, such a unique combination of mount and attachment slots has not previously been taught. The preferred mount design would therefore require a custom mold for the platform and kickstand assembly to obtain the preferred shape and orientation of the apparatus and associated retention holes/slots. The additional attachment options such as elastic retention strap and cording materials are pre-existing items that are available from a variety of sources. The inventor believes that the advantageous quality and unusual results obtained from such a combination of a custom mold in use with commercially available and/or easily-adaptable parts has not previously been recognized or achieved.

Hereafter, the specific design elements of this preferred embodiments will be described with reference to the accompanying drawings and reference numbers. In the following detailed description, reference numerals and letters are used to identify structural elements, portion of elements, surfaces, objects, or features that may further be explained by the entire written specification. Unless otherwise indicated, the drawings are intended to be read together with the specification and are considered to be a portion of the entire written description of the invention. The matters defined in the description, such as the detailed construction and elements, are details provided to assist those of ordinary skill in the art in a comprehensive understanding of the broad scope of the invention as defined by the claims herein.

Figure 2:
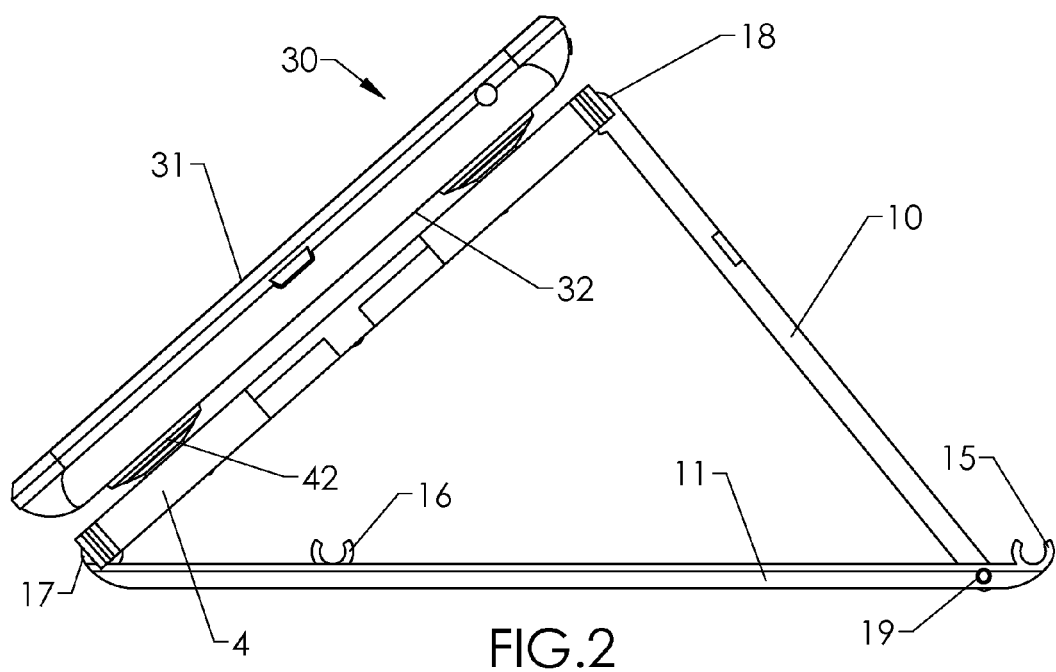
FIG. 2 is a side view of the embodiment of FIG. 1 with four suction cup units in place on the platform (only 2 shown), with kickstand attached to platform while an electronic tablet device is attached via suction cups to the back of the device.

FIG. 1 is a front, isometric view of one embodiment, a mounting apparatus 4 that is connected to the kickstand assembly 10, 11 while an electronic device 30 is attached to the forward facing suction cups 42 on the mount 4 as shown in FIG. 2. The mini suction cups 42 shown in FIG. 2 are attached to the back of the device 32, which is preferably smooth to allow sufficient suction and retention of the device 30. This orientation provides an easy view angle of the device screen 31, due to the angle of tilt created by the short leg 10 of the kickstand assembly. The long leg 11 of the kickstand assembly is attached to the mount platform via circular snap features 17, 18 located at the end of the kickstand legs 10, 11. These circular openings form a partial circle with an opening to allow the cylindrical attachment post(s) 23 to snap into place within the circular snap 17 to remain in place during use of the kickstand assembly. The kickstand assembly includes two legs 10, 11, which are rotatable at an axis point created by a hole 19 and metal pin 13 (not shown) that is held therein to keep the two legs attached to one another, but still allow the smaller leg to rotate around the metal pin as best demonstrated in FIG. 7. A user may purposely remove the kickstand assembly from the respective slot/post 23 attachment, but this requires manipulation and pulling of the circular snap unit 17 out from the cylindrical post 23 in a manner that will not occur during normal use of the apparatus.

Figure 3:
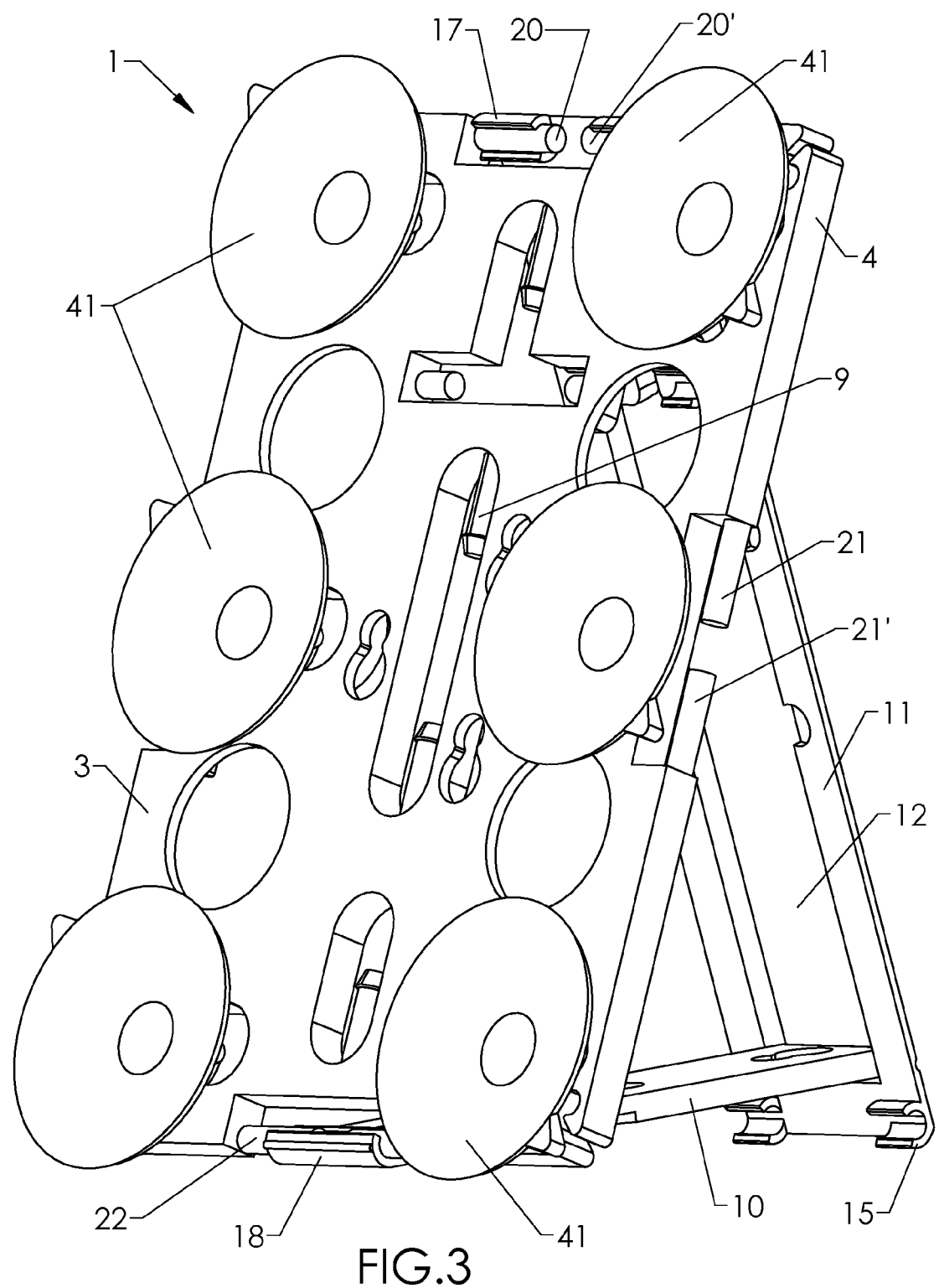
FIG. 3 is a front isometric view of the rigid platform with 6 attached medium suction cups within the slots, while the kickstand is unfolded and attached.
Figure 4:
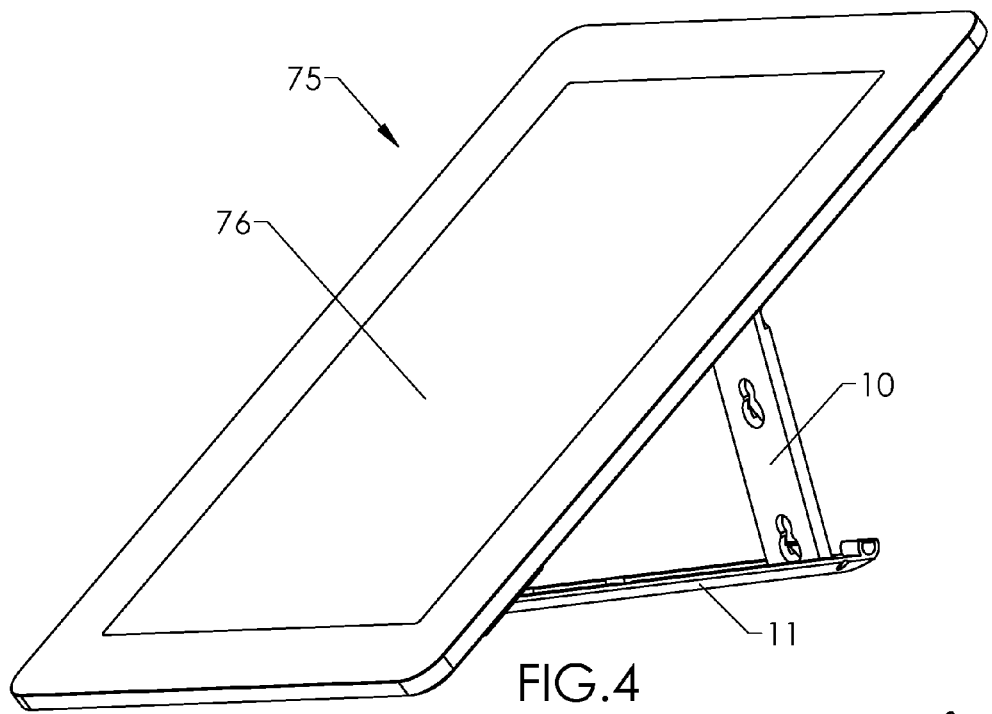
FIG. 4 is a front isometric view of the embodiment of FIG. 3 attached to the backside of a tablet device to allow screen viewing.
Figure 5:
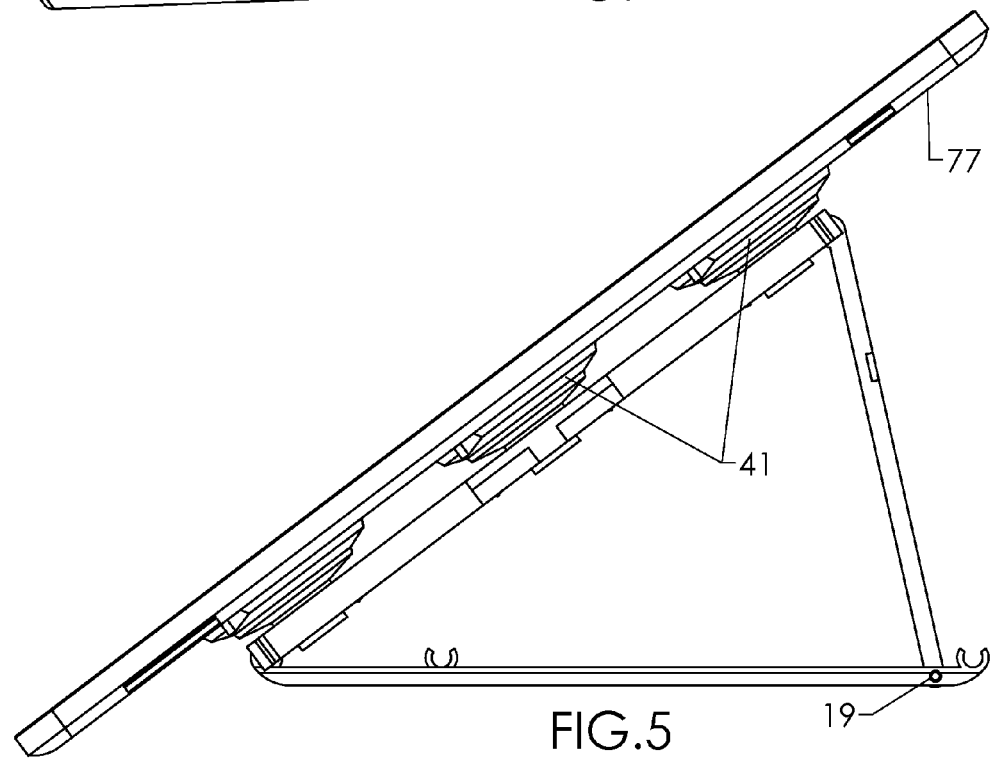
FIG. 5 is a side view of the mounting apparatus and attached device of FIG. 4, with six suction cup units installed in the mounting assembly and the suction cup units attached firmly to a smooth surface at the back of the device.

To obtain a different view angle, the kickstand assembly 11 can be relocated to the cylindrical posts 20, 20', 22, 22' located along the shorter sides of the platform 4, snapped into place at end of the kickstand assembly 17, 18 as shown in FIG. 3. This alteration in view orientation provides a different view angle as shown in FIGS. 4-5. The device 1 in FIG. 3 depicts six attached medium suction cups 41 with side pilot holes inserted onto the attachment posts within the suction cup slots, oriented to be facing to the front side of the mount 3. The ends of the kickstand assembly 17, 18 are snapped into place at the top and bottom of the mount platform 4 by attaching to the cylindrical posts 20, 20' 22, 22'. The device 1 can be used in the orientation depicted in FIG. 3, or can be flipped 180 degrees to provide a different view angle as shown in FIGS. 4-5. The suction cups 41 are shown attached to the back 77 of the tablet device 75 in FIG. 5, allowing the tablet to maintain a resting position with screen slightly tilted by use of the kickstand assembly. The longer kickstand leg 11 will rest upon a flat surface, while the short leg 10 creates a kickstand to prop up the device 75, allowing for hands free viewing of the screen 76.

Figure 6:
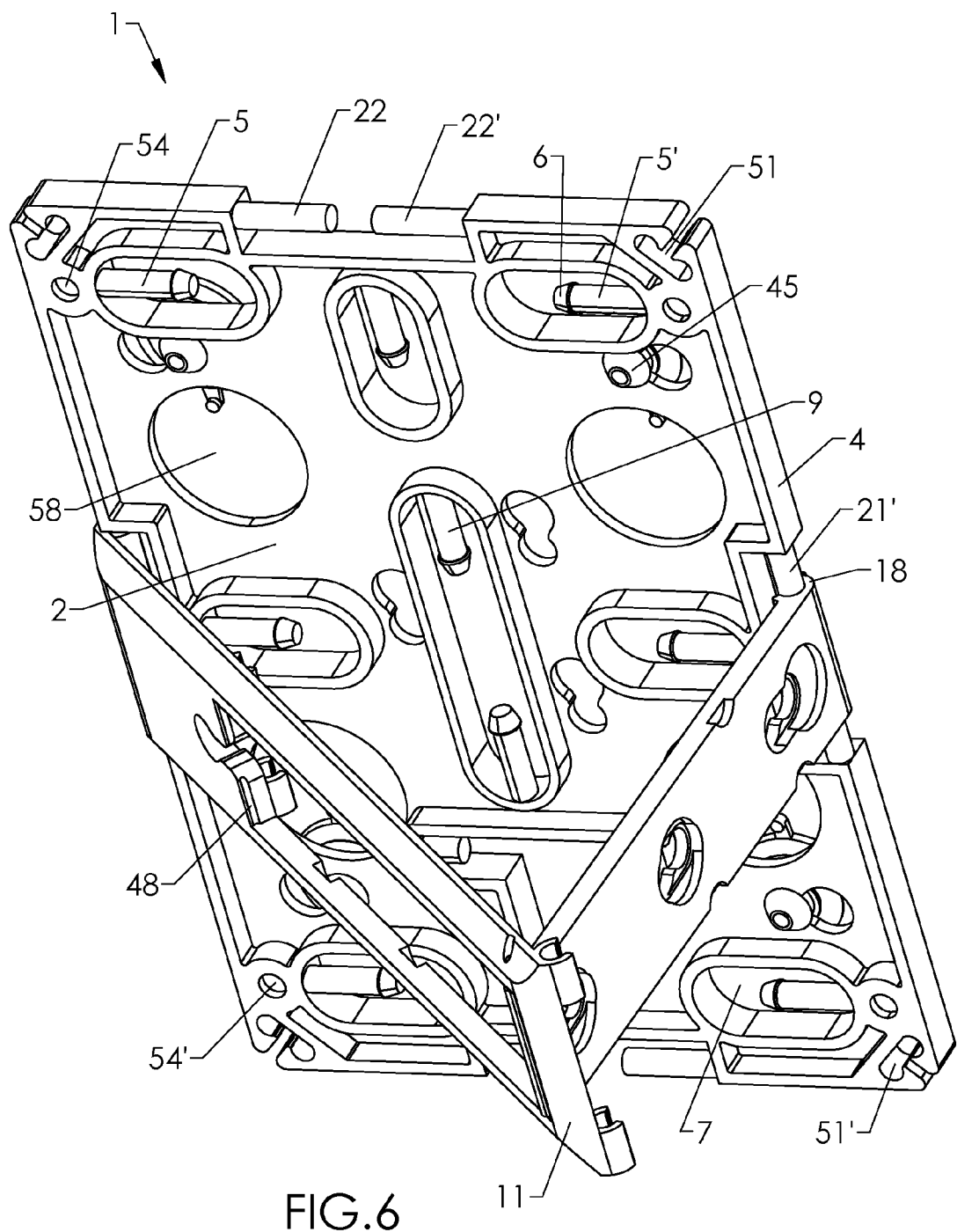
FIG. 6 is a rear isometric view of the mounting apparatus and attached kickstand assembly depicting four mini suction cups attached at the front of the platform, with suction cup knobs protruding to the rear of the mini-suction cup slots.
Figure 7:
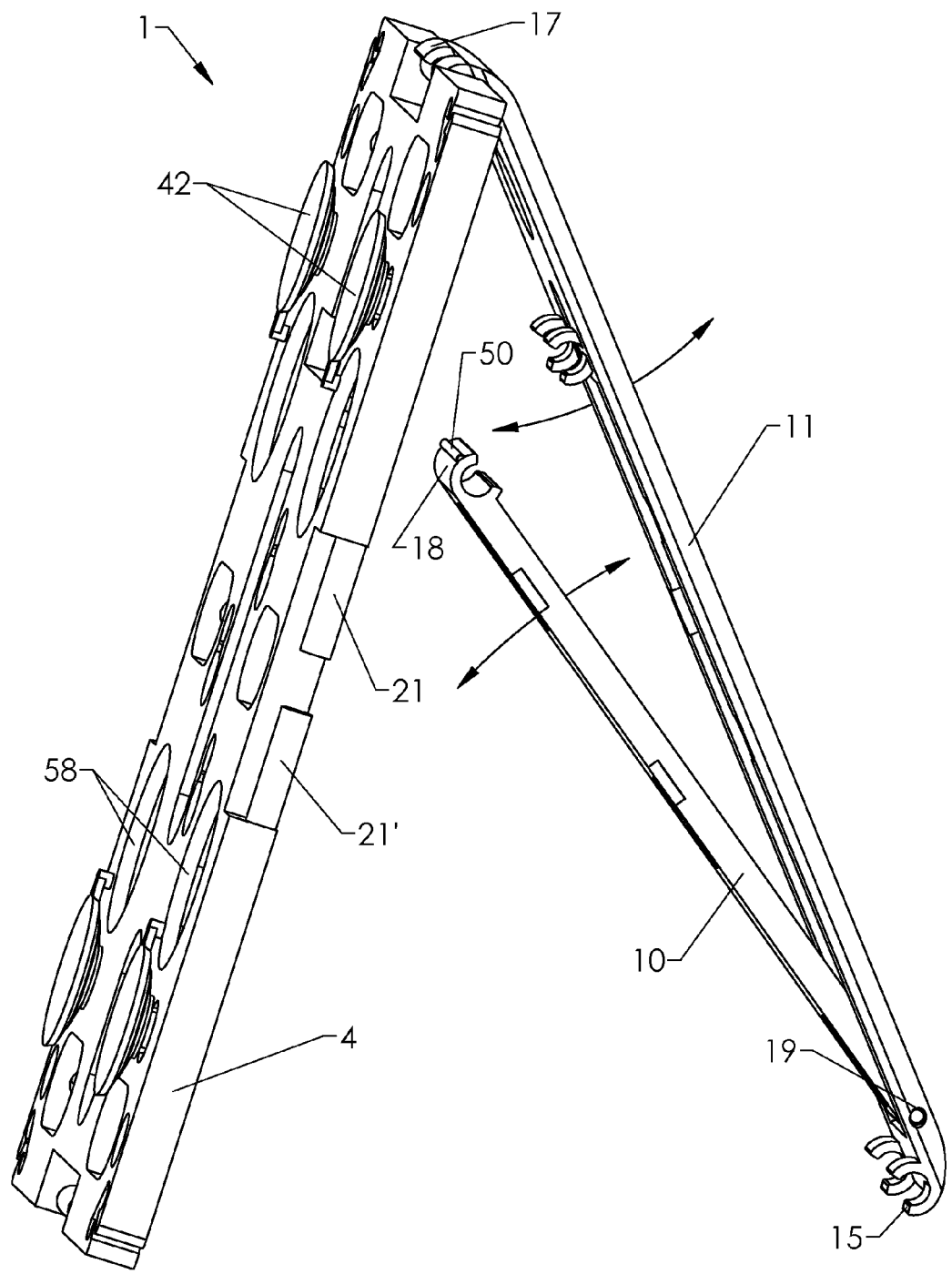
FIG. 7 is a side view of the assembly of FIG. 6 depicting the four attached mini suction cups at the front, with kickstand assembly only partially connected at the rear to demonstrate the detachable and foldable nature of the kickstand.
Figure 8:
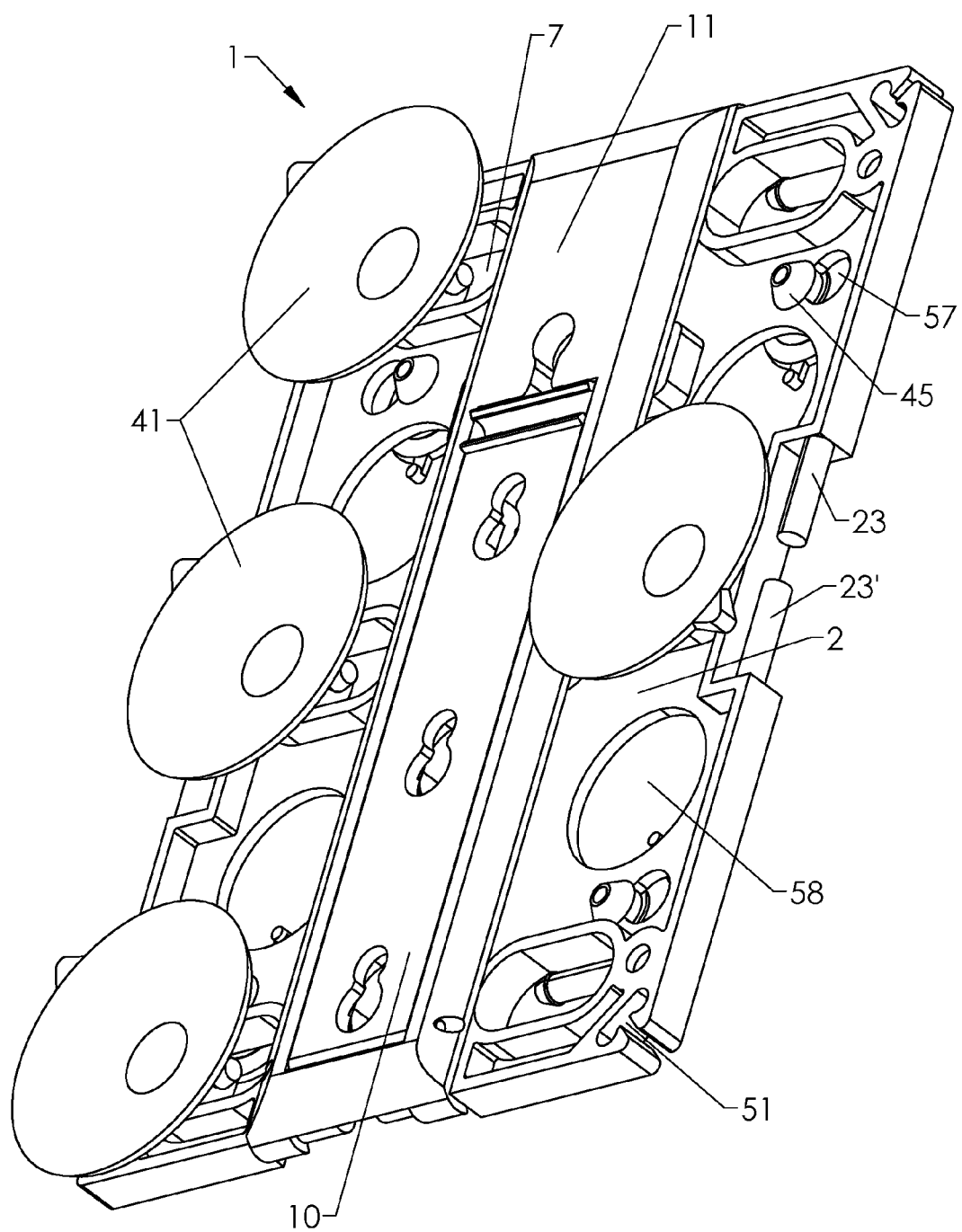
FIG. 8 is a rear isometric view of the mounting apparatus platform in depicting four attached mini suction cups at the front of the platform, four attached medium cups at the rear of the platform, while the kickstand is folded up and attached to the main platform.

Also shown to good advantage in FIGS. 6-8 are cylindrical-shaped posts arms (20, 20', 22, 22', 21, 21', 23, 23') at which the kickstand can be removably attached. Each side of the rigid platform mount 4 contains a set of centrally located cylindrical post arms to serve the purpose of attaching the kickstand. Shown in FIG. 6, the snap opening 18 is attached to cylindrical post arms 21, 21', leaving the upper cylindrical post arms 22, 22' open. These cylindrical post arms 22, 22' protrude towards the center of each side from right and left sides of the main body, generally in the plane of the main body 4. Slots 21, 21' reside between the snap opening 18 to create a tight connection between the kickstand and the mount platform 4. The snap connections 15 and 18 are best shown in FIG. 7 while detached from the platform mount 4. In FIG. 7, the snap attachment 17 is shown to be attached to the upper cylindrical posts. The lower end of kickstand leg 11 contains a hole opening 19 to allow the insertion of a metal pin for connection of the long kickstand leg 11 to shorter kickstand leg 10. This connection allows kickstand leg 10 to rotate around this metal pin connection within the hole 19, thereby providing different attachment angles of the short leg 10 to the platform mount 4. The long leg of the kickstand 11 contains an opening 12 which allows the shorter leg 10 to rotate and fold into the opening 12. The free end 18 of the short kickstand leg 10 includes an elongated nub 50 which extends across the end of the snap feature 18. The protruding nub 50 shown in FIG. 7 acts as a locking mechanism which secures the short leg 10 into place when pushed into the opening 12 that includes a small slot opening 48 shown in FIG. 6, providing the corresponding shape relative to the elongated nub 50. Shown to best advantage in FIG. 8, the short leg of the kickstand 10 can be folded into the opening 12 (not shown) that exists in the long leg 11 to allow the kickstand to fold upon itself in a compact fashion which is preferred for storage purposes. Due to this foldable design, the kickstand legs 10, 11 can fold up as shown in FIG. 8, with snap openings attached to the cylindrical posts (not shown) and the folded kickstand attached at the back side 2 of the device 1.

Figure 9:
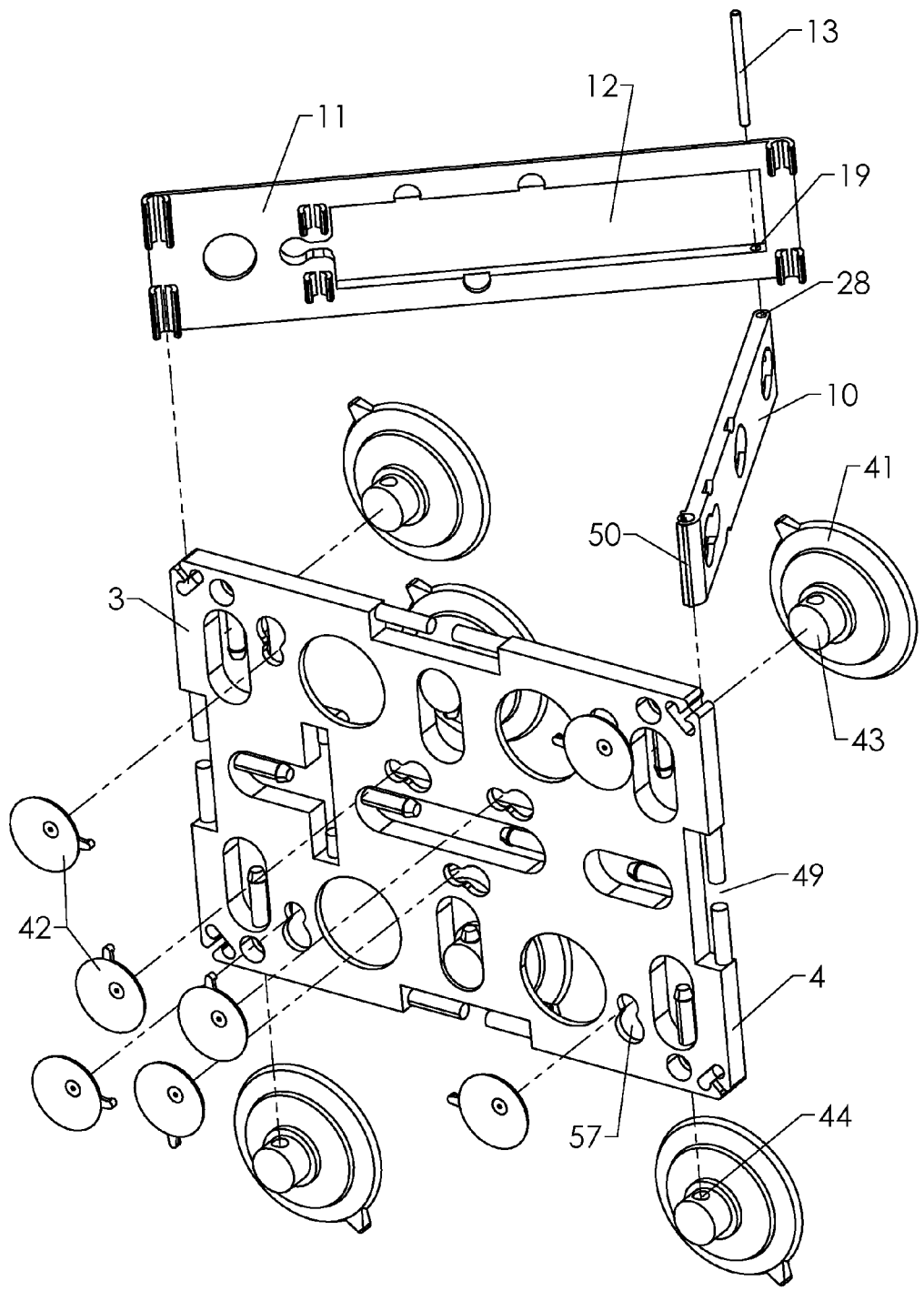
FIG. 9 is an exploded view of the mounting apparatus showing the intended alignment of the mini suction cups with their corresponding slot openings at the front of the platform, with intended alignment of the rear facing medium suction cups with their respective post slots, as well as, the orientation of the kickstand relative to the platform and intended alignment with the attachment pegs.
Figure 10:
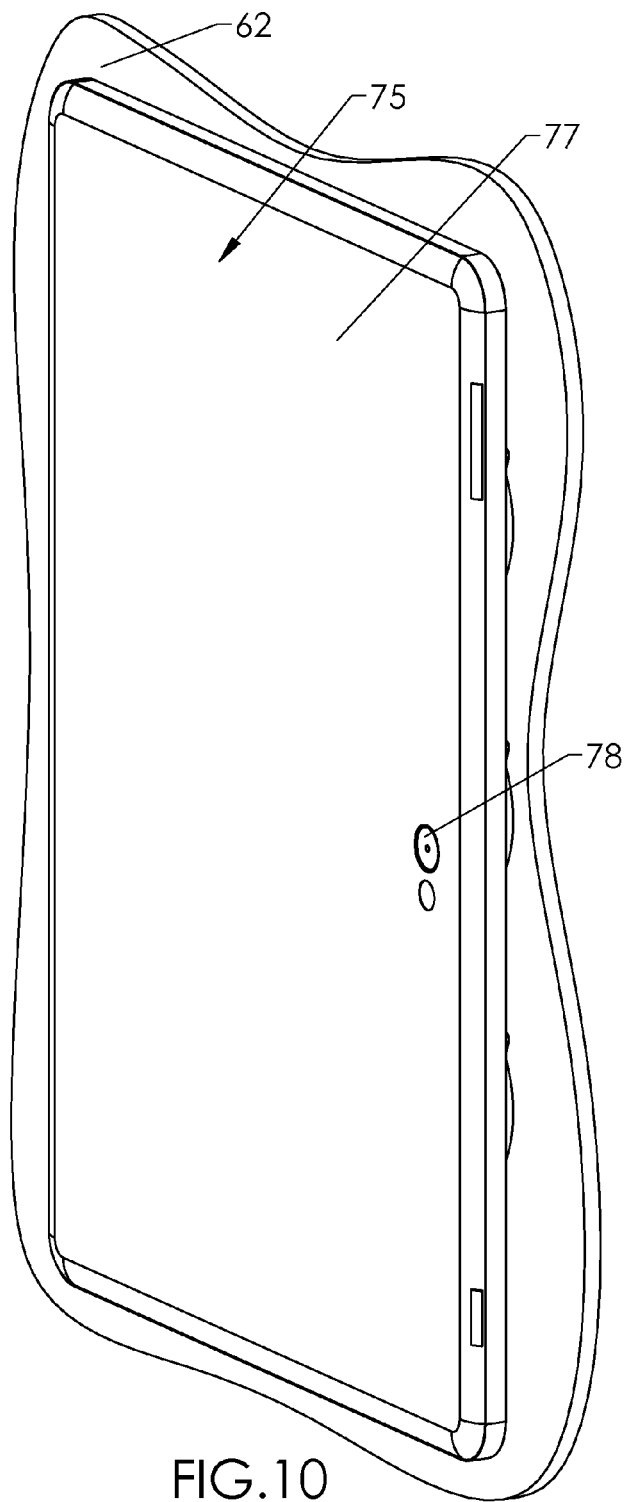
FIG. 10 is a front isometric view of the mounting apparatus shown connecting a tablet device in portrait orientation to a vertical surface.
Figure 11:
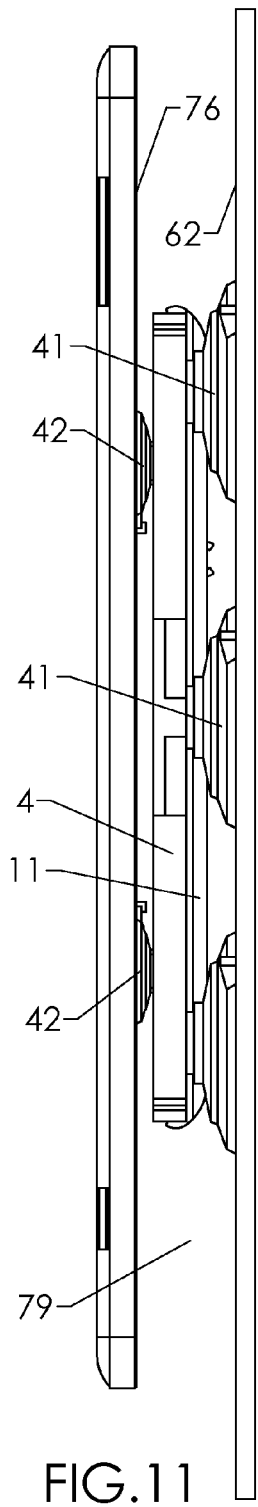
FIG. 11 is a front isometric view of the mounting apparatus and attached kickstand assembly depicted in FIG. 10 shown connecting a tablet device in portrait orientation to a vertical surface by attachment of four mini suction cups to the screen of the tablet and by attachment of six medium suction cups to the smooth vertical surface.

The components of the kickstand assembly are best shown in FIG. 9 as an expanded view clearly depicting the long leg 11 of the kickstand with rectangular opening 12 designed to allow the short leg 10 to fold therein. The pin holes 19 exists at the end of the short leg 10, aligning as shown with the corresponding holes 28 in the longer leg 11. This preferred alignment of holes 19, 28 provides an obvious location at which to insert a metal pin 13, which is of a diameter slightly larger than the hole openings 19, 28, creating a tight fit for the metal pin 20 inside of the holes 19, 28. This tight fit ensures that the legs 10, 11 of the kickstand will not easily become detached from one another during use. At the unhinged rotatable end of the short leg 10 is shown the small outwards protruding nub 50 which acts as a locking mechanism to keep the short leg 10 in place within the opening 12 while the kickstand assembly is folded up for storage. The kickstand assembly can be stored at the back side 2 of the platform mount as shown in FIG. 8, although the platform can still be mounted via suction cups to a smooth vertical surface while the kickstand 11 remains attached as the rear of the mount as shown in FIG. 11. The kickstand assembly is shown attached to the back side 2 of the platform mount 4 in FIG. 13, with additional snap 16 attachment shown within the opening in the main body of the platform mount 4. This additional snap 16 is an optional feature which aligns with the cylindrical arms 24', but does not connect. FIGS. 6 and 8 include the assembled device 1 in two different configurations, illustrating the various aspects and details of the mounting platform 4. Generally rectangular main body 4 has a cored-out rear surface 2, which is desirable for polymeric ("plastic") injection molding techniques to aid in the proper cooling of the molded part. This is very common for plastic molded parts, and therefore these cored out cavities do not serve any specialized functional purpose.

Figure 14:
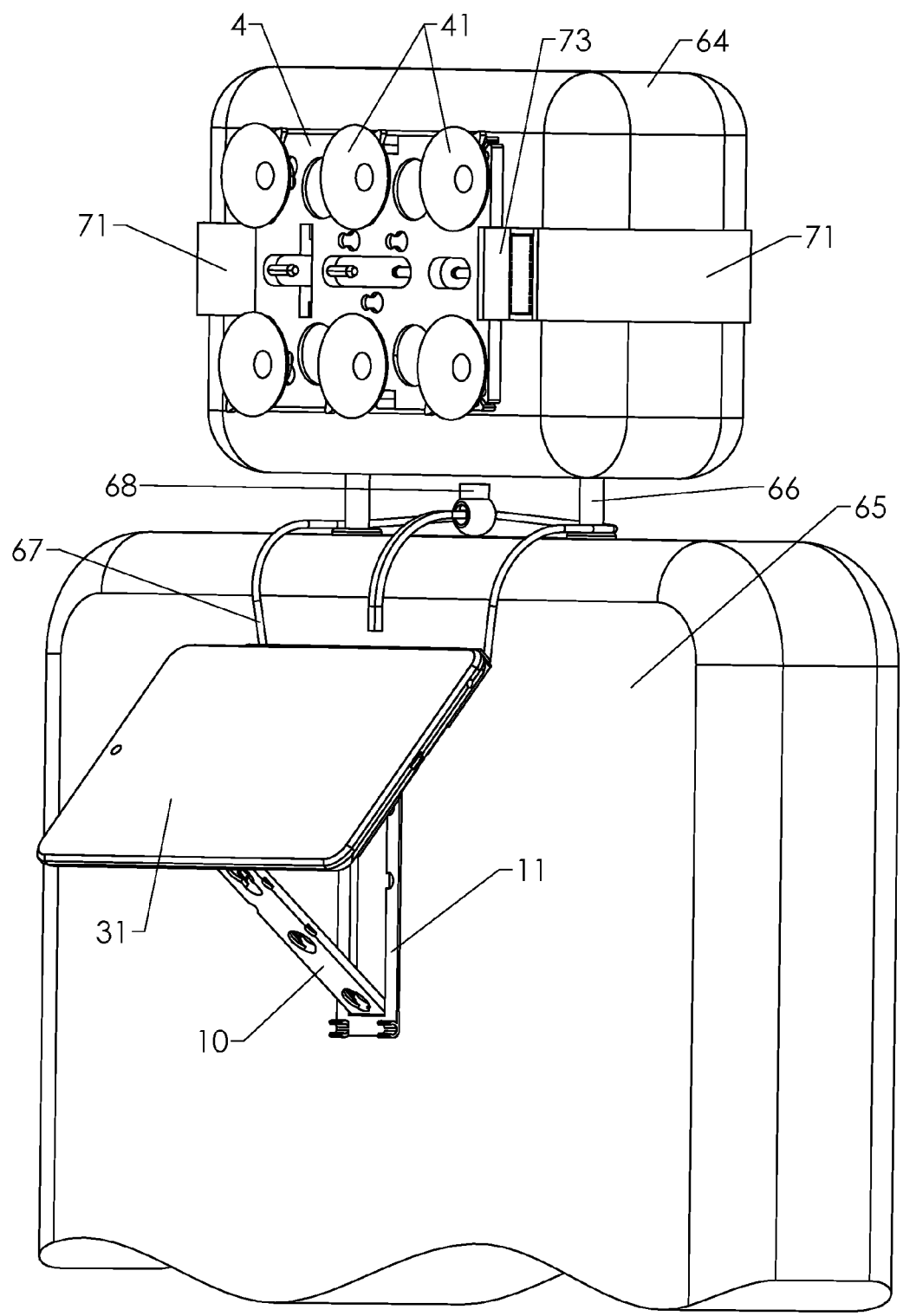
FIG. 14 is a front isometric view of two alternative embodiments of the mounting apparatus; the first demonstrating the optional attachment of the platform via connected elastic retention strap extended and secured around an object (head rest) with suction cups facing outwards to allow for attachment of an electronic device; the second mounting option depicting the mount attached via the cording material and cord lock at the rear of a car seat with tablet attached to facing suction cups to allow screen viewing.
Figure 15:
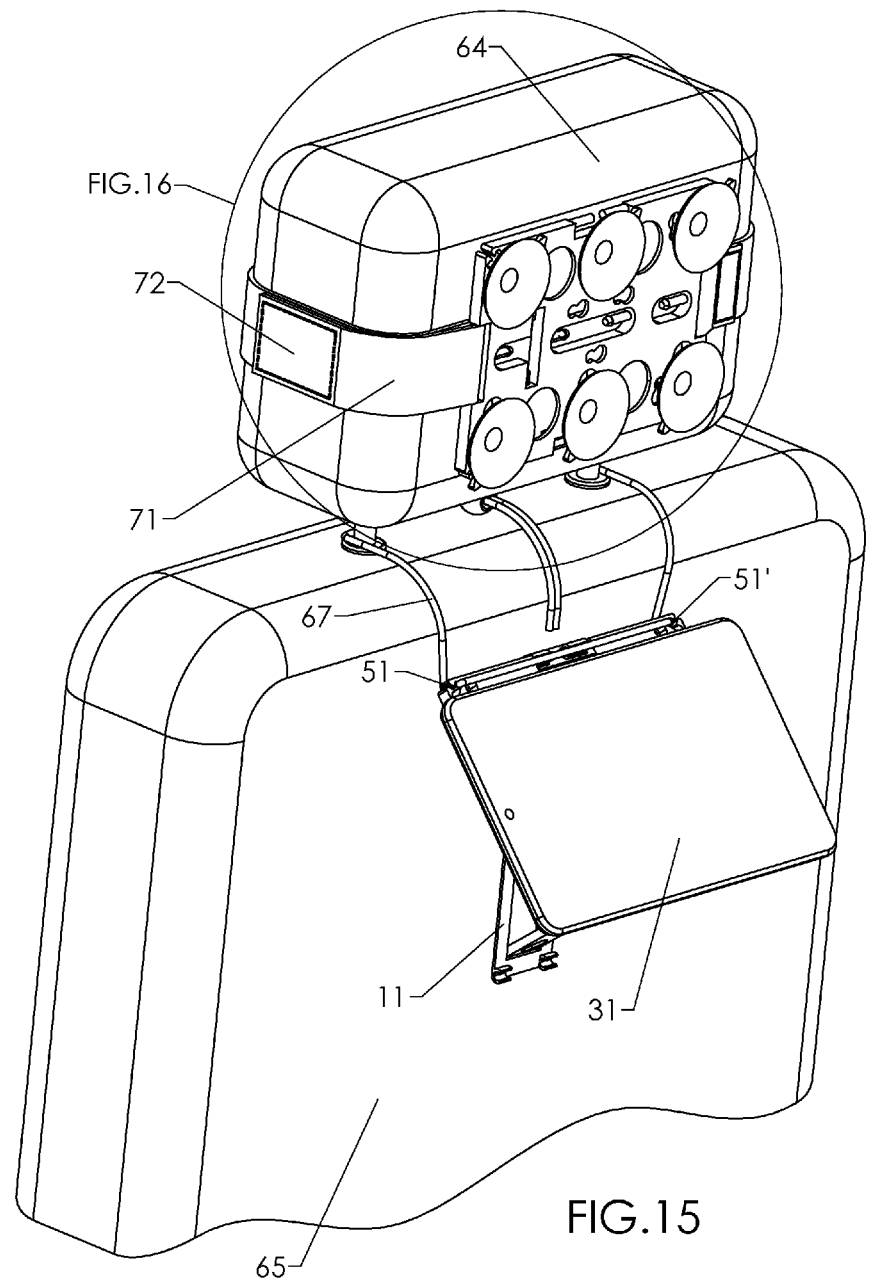
FIG. 15 is a front isometric view of the embodiment depicted in FIG. 14, but from a higher perspective, depicting the hook/loop connection of the elastic retention strap around the head rest; and also clearly demonstrating the preferred attachment of the cording material within the corner cord slots of the rigid platform with attached kickstand assembly unfolded allowing the apparatus to be hung on an object while a table device is attached to front facing suction cups (not shown) in an orientation that allows screen viewing.
Figure 17:
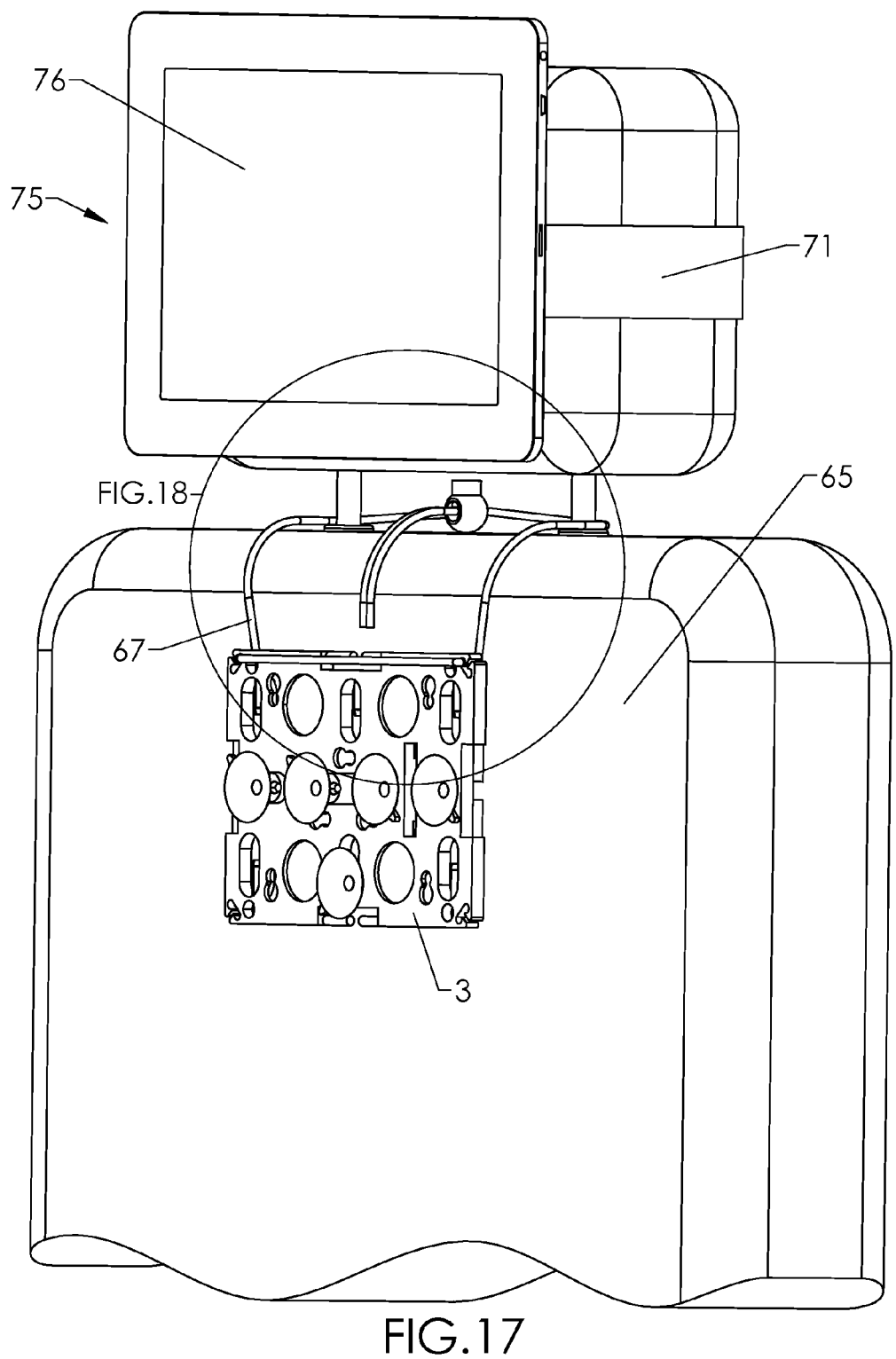
FIG. 17 is a front isometric view of the embodiments depicted in FIGS. 15 and 16, wherein the electronic device is attached to the platform attached to the headrest, and the rigid platform at the seatback is shown to be hung via the cording material as preferably attached to the cording slots within the rigid platform.
Figure 18:
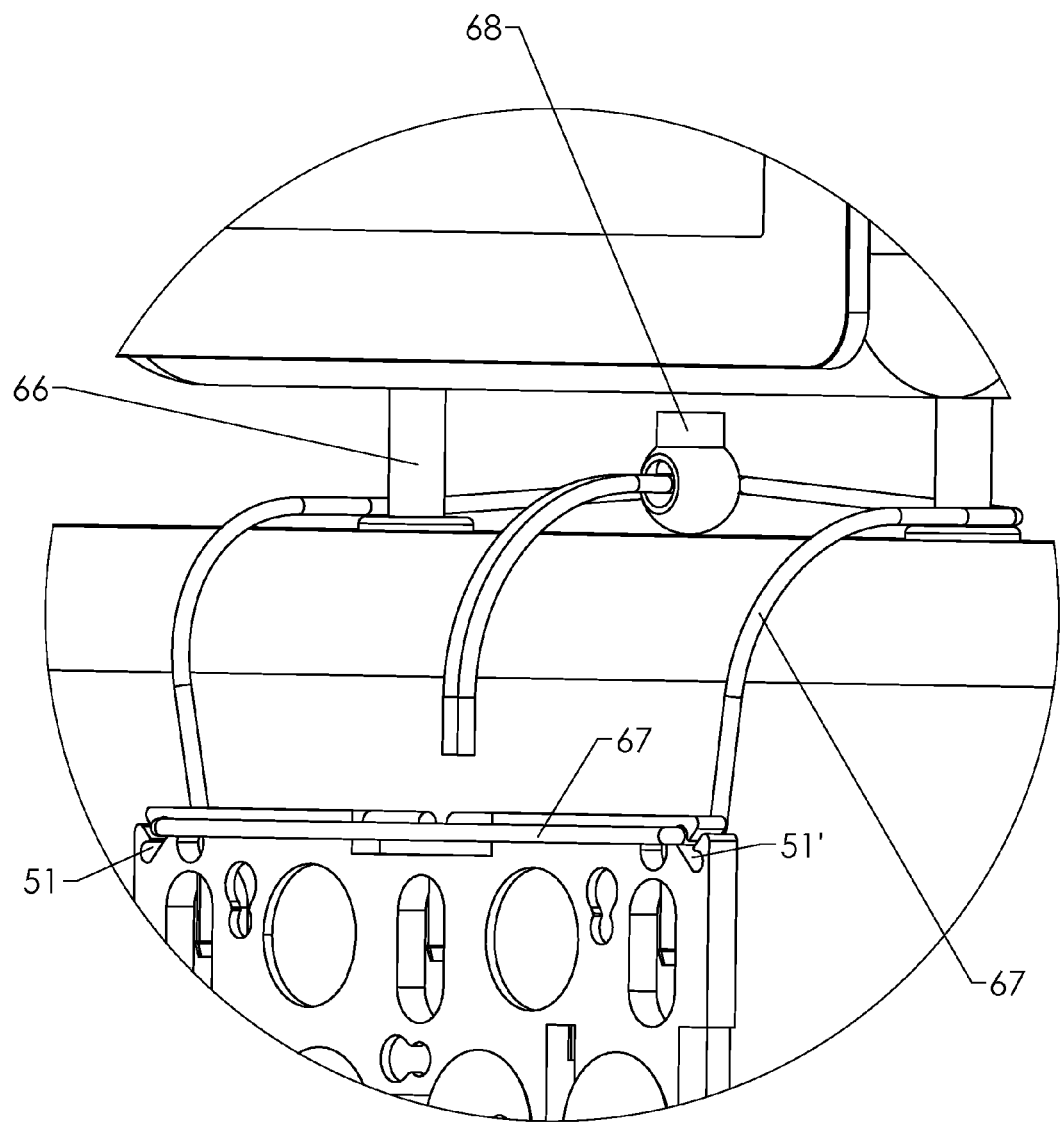
FIG. 18 is a close up view of a portion of FIG. 18 depicting the front isometric view of the mounting apparatus is hung from the seat back via a cording material extended around the head rest and secured via cord locking mechanism.

The kickstand assembly serves additional purposes beyond utilization upon a flat surface simply. The kickstand can thereby by used in conjunction with the multiple suction cup platform while the entire apparatus is suspended from an object, such as the back of a car seat. This alternative use configuration is shown in FIG. 14, with kickstand assembly 10, 11 attached to the platform mount (mount not shown due to location behind the device screen 31). The cording material 67 is depicted slung/extended around the vertical supports 66 of a head rest 64 which is attached a larger seat 65. This seat 65 could be conceived as a car seat, bus seat, or airplane seat, or some other similar seat design where there are multiple rows of seats configured to allow persons to sit behind the seat(s) thereby allowing a person to secure a device to the seat back in front of them. This scenario is depicted in FIGS. 14, 15, and 17. The kickstand assembly therefore becomes a critical design feature in this configuration as the kickstand assembly provides multiple orientations in use with the mount platform to allow for hands free screen viewing for a person while the device is attached to the back of the seat. As shown in FIG. 14, the kickstand assembly 10, 11 is providing a, upward tilting orientation of the platform mount which then connects to the back of the device to allow the screen 31 of the device to be facing directly toward the user. This connection is accomplished as shown in FIG. 2 with use of multiple suction cups 42 facing outwards from the platform mount 4, while the kickstand assembly 10, 11 is attached at upper and lower cylindrical arm posts 20, 20', 22, 22'. The longer leg 11 of the kickstand is forced into the back of the seat 65 due to the weight of the device pushing downward onto the kickstand assembly 10, 11. The platform mount is attached via the cording material 67, which is slotted into the cording slots 51, 51' as shown in FIG. 15. This cording material 67 is first pushed/pulled into the slot openings 51, 51', after which the cording is extended over the head rest 64, pulled down and around the head rest support column 66, and held in place via a cord locking mechanism 68.

The length of the cording material 67 can then be adjusted via the cording lock 68 to provide varying heights of the apparatus relative to the user. For example, a taller person may desire to locate the device higher up on the seat back to decrease the distance from the eyes to the screen 31, while a shorter person may desire to locate the device lower on the seat back to due to their lower position. The cord lock mechanism 68 serves as this adjusting mechanism, operated by depressing a spring loaded button on the cord lock 68, which allows the user to pull additional cording material 67 through the cord lock and lengthen or shorten the distance that the attached apparatus may hang from the head rest support columns 66. The apparatus can optionally be used without the kickstand in this configuration as shown in FIG. 17, where the front of the platform mount 3 is outward facing with attached suction cups and the cording material 67 is inserted into the cording slots on the mount 3, while hanging at the back of the seat 65. A close up view of this orientation is provided for more detail in FIG. 18 wherein the cording material 67 is inserted into the corner cording slots 51, 51' while extended around the headrest support columns 66 and cording material 67 is adjusted to the desired height while held in place with the cord locking mechanism 68. This configuration is provided without the inclusion of an electronic device to clearly depict the preferred orientation of the cording material 67 in the cord slots 51, 51', and use in conjunction with the cord lock mechanism 68. This simple cording 67 attachment option with connected cord lock 68 provides enhanced utility of the platform mount 4 and kickstand assembly beyond simple use on flat surfaces, or use on smooth vertical surfaces.

Figure 12:
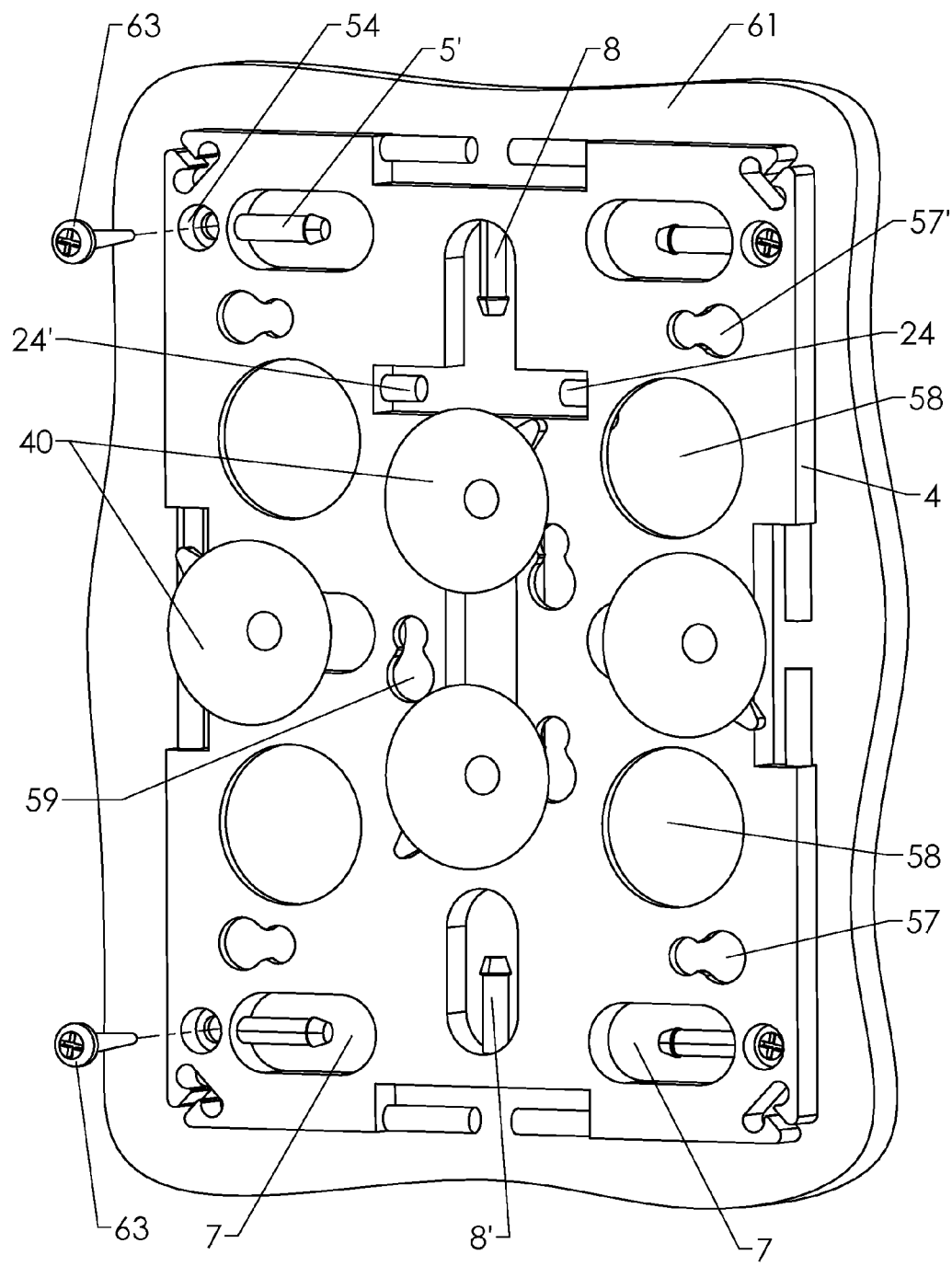
FIG. 12 is a front isometric view of an alternative attachment method of the mounting apparatus as being securely mounted to a vertical surface via four screw mechanisms, with an arrangement of suction cup different from those previously shown, but still allowing for attachment of various electronic devices.

FIG. 12 depicts a front view of the preferred platform mount design with multiple suction cup retention posts and slots located in various areas on the platform. As understood from FIGS. 6 and 12, the main body of the platform mount 4 contains one or more apertures, and preferably a plurality of apertures, which are each also called herein a "hole" or "slot" 22. Each slot/hole 7, 57, 58, 59 extends all the way through the main body 4 from the front surface to the rear surface. The orientation and location of each of the respective slots/holes is preferably adapted to capture the suction cups yet maintain sufficient separation/distancing of the cups so as to allow each cups to properly function when fully compressed rather than abutting or interfering with adjacent cups. FIG. 12 depicts the preferred locations of the various side pilot cup retention posts 5', 8, 8' as identified. As shown four of the ten total are depicted as having small suction cups 40 inserted within the side pilot hole cup slots with suction cups facing outwards. The knob of the suction cup (not shown) with side pilot hole is inserted into the gap and pushed into place onto the retention post 5'. The slots 7 are each ovular in shape, having a rounded portion on one side and a retention arm 5 and mushroom tip (FIG. 6-6) as is best illustrated by the empty slots 7, 7' at the lower corner regions of the main body 4 in FIG. 12. As is clearly shown in FIG. 6, the enlarged portion in the shape of a mushroom tip 6 at the end of the retention arm 5' provides a diameter that still allows for insertion of the side pilot hole suction cup unit 41, especially when the unit is pushed/manipulated to be inserted onto the arm post 5.

Figure 19:
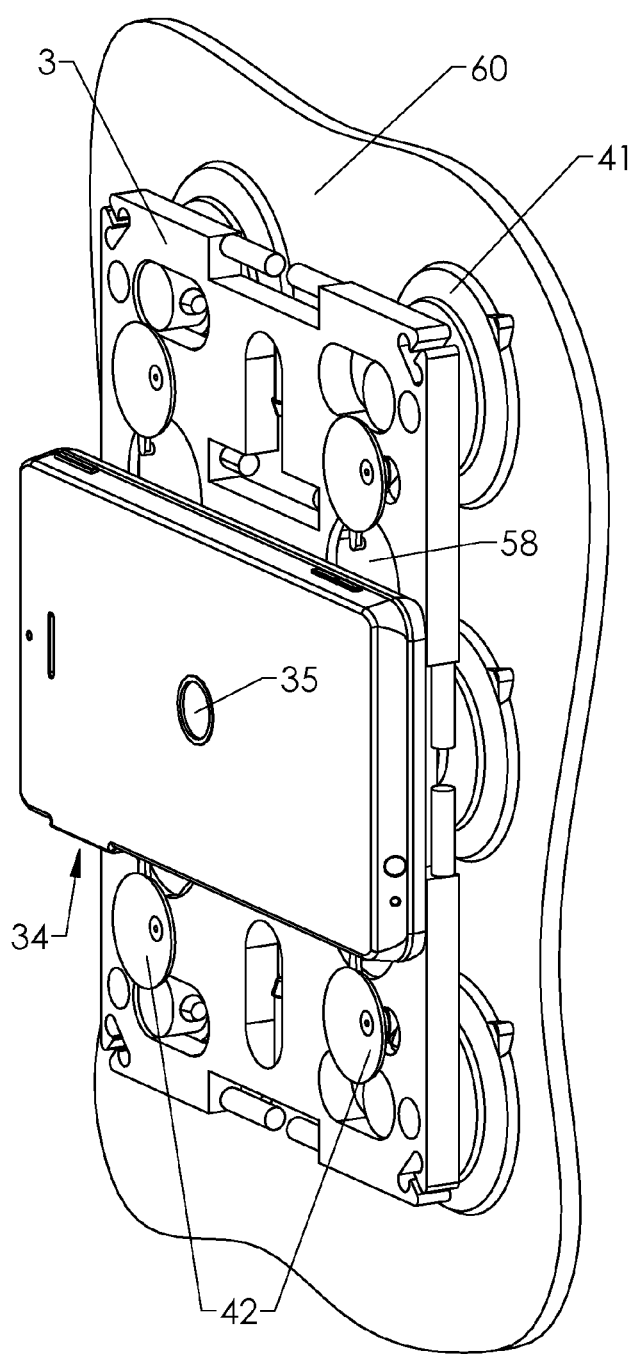
FIG. 19 is a front isometric view of the rigid platform with 6 attached medium suction cups within the slots, wherein the medium cups are attached to a smooth surface, while the mini suction cups at the front of the platform secure a smartphone device in landscape orientation.

The central slots 9 are depicted in FIG. 3, which contain retention posts aligned vertically rather than horizontally within the outer slots which are shown to be securing the medium sized suction cups 41. Due to the circular design of the side pilot hole cup units 41, the retention post(s) 5 can be oriented in any direction, up, down, left, or right, and the suction cup will attach in the preferred orientation, to align with the remaining cups as desired. This mounting system allows cups to be easily removed and changed locations, or removed to be replaced with a different size of cup depending on the intended use and corresponding electronic device. The preferred mount platform contains four circular holes 58 which act as relief points within the mount that allow a user to insert finger tips into the space to allow access to the rear of the device, one such orientation is depicted in FIG. 19, clearly depicting the hole opening 58 along the edges of the device 34, thereby providing a logical location(s) to insert one's finger(s) to remove the device 34 from the suction cups 42. The preferred mount optionally includes circular mount holes 54, which allow a screw mechanism 63 to be inserted through as an alternative method of attaching the platform mount 4 to a vertical surface 61. This vertical surface 61 could represent a variety of materials, but is preferably one that allow for screw mechanisms 63 to be installed. The smaller slots 57, 57' are designed for the mini thick neck mushroom head suction cups.

Figure 13:
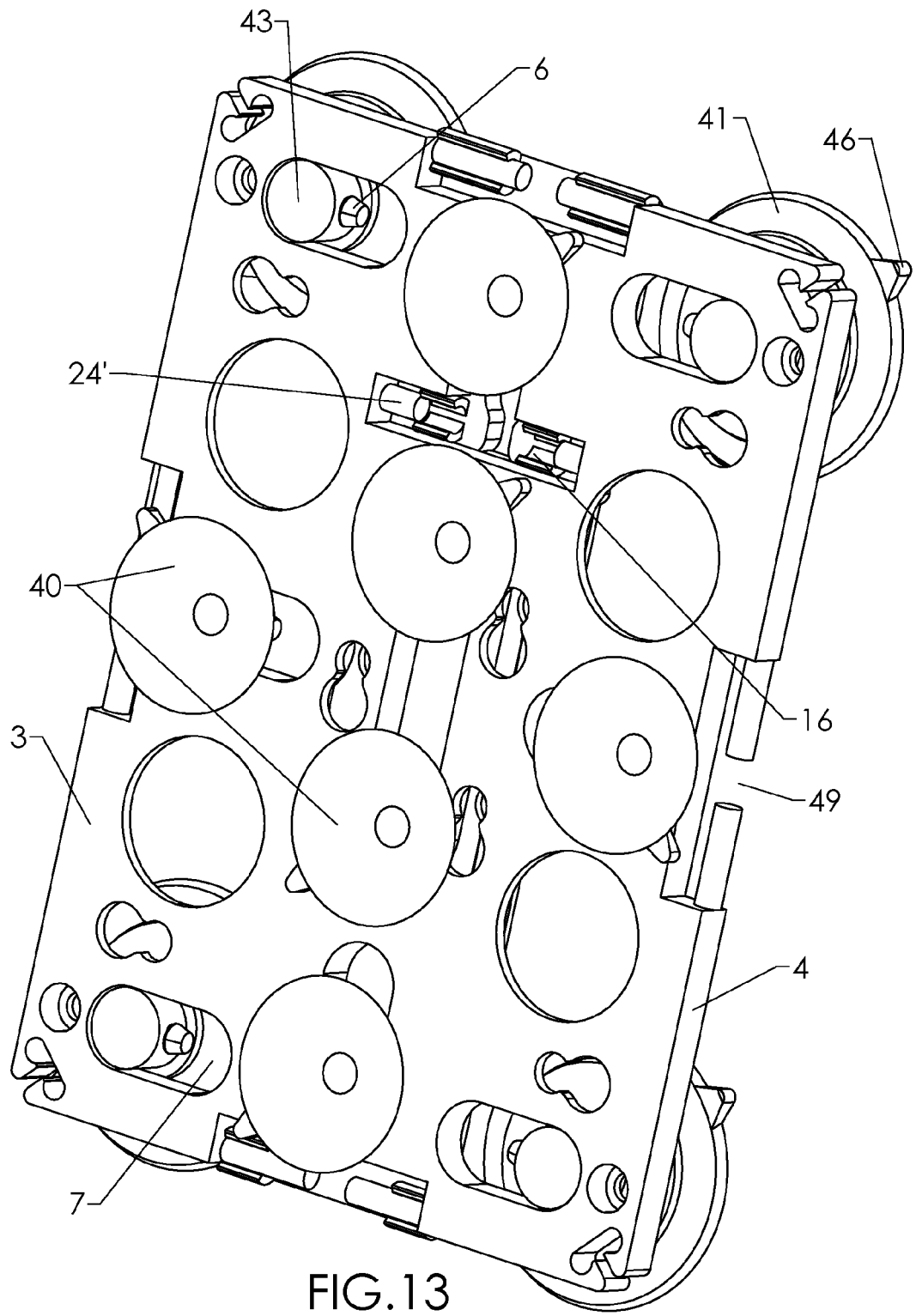
FIG. 13 is a front isometric view of an alternative embodiment of the mounting apparatus and attached kickstand in folded up position, with only four medium suction cup units attached at rear within the peg slots, while six small suction cups are simultaneously attached at the front to the various peg slots, demonstrating the flexibility in slot usage with suction cups oriented to the front or back, all while the kickstand is attached.

The mount platform contains a variety of suction cup slots and attachment options, many of which are best shown in FIG. 6 at rear view of the mount depicting the back side 2 while the kickstand assembly 11 is attached. There are six horizontally aligned suction cup slot openings within the main body of the mount 4. These suction cup slots 7 are designed to allow attachment of suction cups with side pilot holes, thus each contains an opening 7, with inward extending cylindrical post 5, 5', which contains a mushroom tip 6. The suction cups design features are best shown in FIG. 9 depicting the suction cup 41, suction cup knob 43, and side pilot hole 44 which extends through the diameter of the knob 43. This basic suction cup design with side pilot hole 44 thus allows the suction cup knob 43 to be inserted into the open slot 7 as shown in FIG. 6, then attached by pushing the tip 6 of the attachment arm 5 into the side pilot hole 44 of the suction cup. The intended design of the attachment post is to contain a post 5 diameter approximately equivalent to the side pilot hole diameter 44, with a mushroom tip 6 which is larger in diameter. This mushroom tip 6 thereby can be extended into and through the side pilot hole 44, but is not easily removed. The preferred attachment configuration is best shown in FIG. 13, depicting the mushroom tip 6 extended through the side pilot hole that exists within the knob 43 of the suction cup 41. A user may purposely attached the various side pilot hole suction cups within the respective slot 7 and post 5 attachment, but this requires manipulation and pushing of the knob 43 and side pilot hole 44 onto the mushroom tip 6 and through the side pilot hole 44. These suction cups can thereby be removed in a similar fashion by pulling the suction cup knob 43 off of the post 5 in a manner that will not occur during normal use of the apparatus.

The slot(s) 7 is designed to accommodate a suction cup(s) 41 as depicted in FIG. 13, with mushroom tip 6 extended through side pilot hole opening within the suction cup knob 43 as shown. The rear of the platform as depicted in FIG. 8 identifies the slot opening 7 at which the medium side pilot hole cups 41 are attached via the post and mushroom tip. At the rear of the platform 2 is shown the thick neck mushroom head 45 of the mini suction cup as being inserted into the slot 57 and retain in place. FIG. 8 depicts the shape and location of an optional design feature 51 that allows for the insertion of a braided rope or cording material. The cording slot(s) 51 are preferably located at each corner of the platform 4, and are designed with a small slot opening and shape as shown that will preferably keep the cording material retained within the slot during use. The cording can then be removed while not in use.

The size of the side pilot hole suction cups can vary depending on the requirements of the user, however side pilot hole suction cups come in a variety of sizes, small, medium, and large. The sizes depicted in the drawings include small suction cup with side pilot hole 40, medium size suction cup with side pilot hole 41, and mini suction cup units 42 with thick neck mushroom head 45. These are the preferred suction cup sizes and designs, however alternative suction cup sizes could be used. The preferred design of the side pilot hole suction cups include a release tab 46, as clearly shown in FIG. 13. The preferred location of the suction cup slot(s) 7 are to be preferably located near the side and center of the platform mount 4 to allow for access to the release tab 46 while the suction cup 41 is attached to the platform mount 4 as shown. The release tab 46 is therefore preferably aligned outward and away from the platform mount 4 main body to allow for such access. The suction cups 41 are of a size that results in a strong suction/vacuum connection between the cup itself and a smooth surface, therefore restricting the ability to simply pull the cup off of the surface. The release tab 46 design is common for such cups and is therefore not a specialty design, however it is the preferred design for use with the platform mount.

Figure 20:
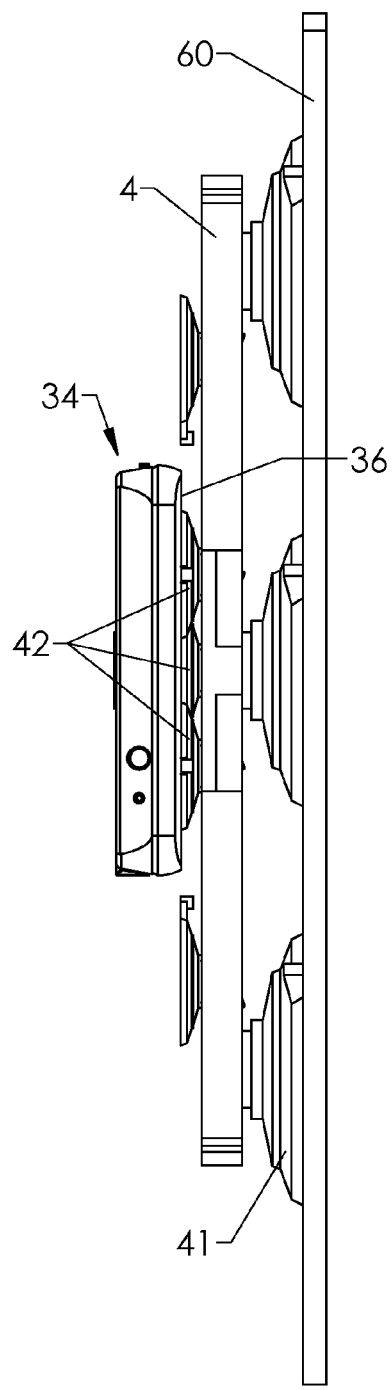
FIG. 20 is a side view of the embodiment depicted in FIG. 19.

The mini suction cups 42 do not require use of the release tab due to their smaller size and corresponding lesser attachment strength. As a result of this strength differential, a device attached to the platform mount 4 via multiple mini suction cups 42 can simply be pulled off of, or pulled away from, the mini suction cups to release the device from said cups. This configuration is best shown in FIG. 20, with the screen 36 of an electronic device 34 attached to multiple (three) mini suction cups 42, while the platform mount 4 is securely attached to a smooth surface 60 via use of the medium sized side pilot hole suction cups 41. This strength differential created by the depicted configuration in FIG. 20 thereby allows the device 34 to be pulled away from the mini suction cups 42, but such pulling forces are not sufficient to remove/release the larger medium cups 41, thereby allowing the platform mount to remain securely attached while electronic devices are attached/removed. The preferred method for removing the electronic device 34 from the mini suction cups requires a user to insert a finger(s) into the gap/opening behind the device to gain a strong hold onto the device prior to removal. The preferred mount design and configuration therefore provides four circular slot openings 58, best shown in FIG. 12. These slot openings 58 thus create a logical location at which a user can extend fingers into to gain a strong hold/grip on the device and simultaneously allow the user to exert a pulling force onto the device, thus allowing them to pull the device from the suction cup attachments affixed to said device. These slot openings 58 are generally only exposed while the mount platform 4 is in use with a smaller device, such as a smartphone, as depicted in FIGS. 19-20. Larger tablet devices will often extend beyond the edges of the mount, thereby covering the circular slots 58, which are not needed for larger devices due to fact that the edges extend beyond the mount. The orientation of the mount relative to the device creates a gap 79 as depicted in FIG. 11. The use of the platform mount 4 with tablet device 77 while attached to smooth vertical surface 62 creates this gap opening 79, which is a logical location for a person to extend their fingers into prior to removing the device from the mount. The preferred removal technique for the tablet device 75 would be to place both hands onto the device, with multiple fingers inserted into the gap 79, while finger tips are then compressed against the screen of the device 76 to allow the user to pull the device 75 off of, or away from, the mini suction cups 42.

FIGS. 19-20 depict a front isometric view and side view of the platform mount, wherein the device 34 is suspended from the surface 60 by secure suction-connection of the apparatus to both the device 34 and the surface 60. Due to the location of the device 34 on the apparatus 4, a circular hole opening 58 is located behind the edges of the electronic device 34 and the platform mount 4 as shown in FIG. 19. This hole opening 58, relative to the edge of the device, is shown to best advantage here, which allows a person to insert a finger(s) into the hole 58, thereby allowing him/her to pull the electronic device 34 outwards to detach from the screen surface 36 and outward facing cups 42. The apparatus 4 is suction-connected to the screen 36 for a landscape orientation wherein the platform mount 4 is centrally aligned within the outer sides of the electronic device 34, with the screen 36 extending partially over the hole opening(s) 58. In other words, the horizontal centerline of the platform mount 4 is preferably aligned with and parallel to the horizontal centerline of device 34 to allow the preferred orientation as aligned with the hole openings 58.

The four sets of cylindrical post arms 20-20', 21-21', 22-22', and 23-23' are located along each side of the main body 4 of the platform as shown in FIG. 13. These cylindrical posts protrude towards the center of each side from right and left sides of the main body, generally in the plane of the main body 4. The two posts of each set of arms extend toward each other but preferably do not meet or touch, leaving a gap 49 as shown in FIG. 13 for insertion of the respective strap loop, as will be understood after viewing the drawings. As such, these cylindrical post arms are designed to accomplish multiple tasks; serving as a connection point for the snap openings 15, 17, 18 at the ends of the kickstand assembly, but also proving an alternative use for the connection of an elastic velcro strap assembly 71 with sewn in place loop at the proximal end and hook/loop fastener sewn in place at the distal end of the strap. Elastic velcro material is available in the market, typically manufactured with the loop portion of the fastening system being located on the elastic strap, while the hook portion is not elastic, typically manufactured in a roll/tape with no elastic qualities. The preferred width of the hook/loop strap assembly would be 1"-2" wide, depending on the width of the cylindrical post arms, as they would preferably be a similar size/width. The overall length of the strap assembly is preferably 12" to 18" long, but alternative lengths could be conceived depending on the object to which the mount 4 main body is being strapped to. Due to the elastic qualities of the preferred velcro elastic, the length of the strap would therefore stretch, or extend to allow adjustment of the strap to conform to longer lengths, while maintaining a tight wrap around an object. The use of these materials allows for the creation of a strap assembly which can be used in conjunction with the platform mount to achieve alternative use configurations.

Figure 16:
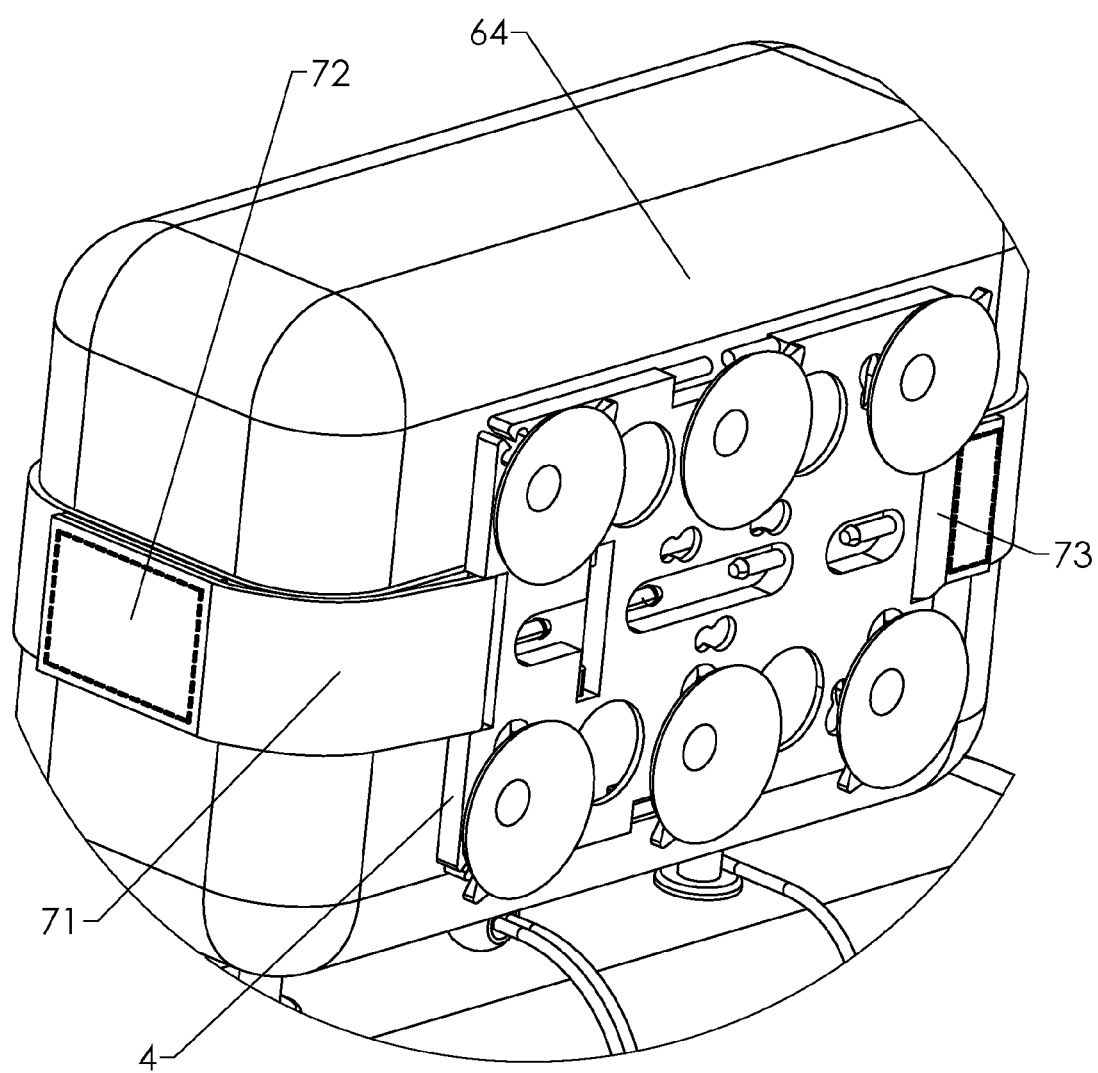
FIG. 16 is a close up view of a portion of FIG. 15 depicting the front isometric view of the mounting apparatus connected to head rest via elastic retention strap assembly attached at both sides of the rigid platform.

This alternative use with the hook/loop elastic strap assembly is demonstrated in FIGS. 14, 15, 16, and 17, depicting the strap assembly connected to the platform mount on opposing sides within the cylindrical post slots 20, 20' and 22, 22', which are not shown due to their locations behind the strap assembly. FIG. 14 depicts a front isometric view a passenger seat 65 with attached head rest 64. The elastic strap assembly is comprised of three parts as shown in FIG. 16; a length of elastic velcro material 71, a sewn loop 73 at the proximal end, a patch of hook fastener 72 sewn at the distal end. The sewn patch of hook fastener 72 is preferably sewn facing inward to allow connection with the outward facing loop fastener 71 which thereby allows a tight connection. To make the preferred attachment the sewn loop end 73 is partially inserted into the gap 49 between the cylindrical posts 22, 22', after which the sewn loop is pushed down onto and around the cylindrical post arm, and then extended upwards over and around the opposing post. This preferred loop/post attachment creates a tight connection between the two parts so as to eliminate the potential that the strap loop will come undone during normal use, and removal of the strap loop requires manipulation and pulling of the loop off of the posts. Once the proximal end of the strap is connected to the platform mount 4, the distal end of the strap can then by wrapped around the head rest 64 and inserted into the gap slot between the main body 4 and the cylindrical post arms 20, 20'. This insertion of the distal end then allows the strap to be pulled through and wrapped back upon itself to allow the hook fastener 72 to be attached to the outward facing loop material 71 as clearly shown in FIG. 16. The two arms of each set of arms extend toward each other but preferably do not meet or touch, leaving a gap for insertion of the respective strap loop, as will be understood after viewing the drawings.

The alternative use of the mount with the hook/loop elastic strap assembly 71 demonstrated in FIG. 17 depicts a tablet device 75 attached to the mount 4 and suction cups as shown in FIG. 16. The mount 4 is not shown in FIG. 17 as it is located behind the device 75. The alternative mounting option allows for hands-free viewing of the screen 76 of the device 75 while a user is sitting in the seat (not shown) which is assumed to be located behind the seat 65 shown in the drawings. Depending on the size of the device 76, the number of suction cups can be altered to accommodate various weights or sizes, thereby allowing such uses with a broad array of table or e-reader style devices.

Figure 26:
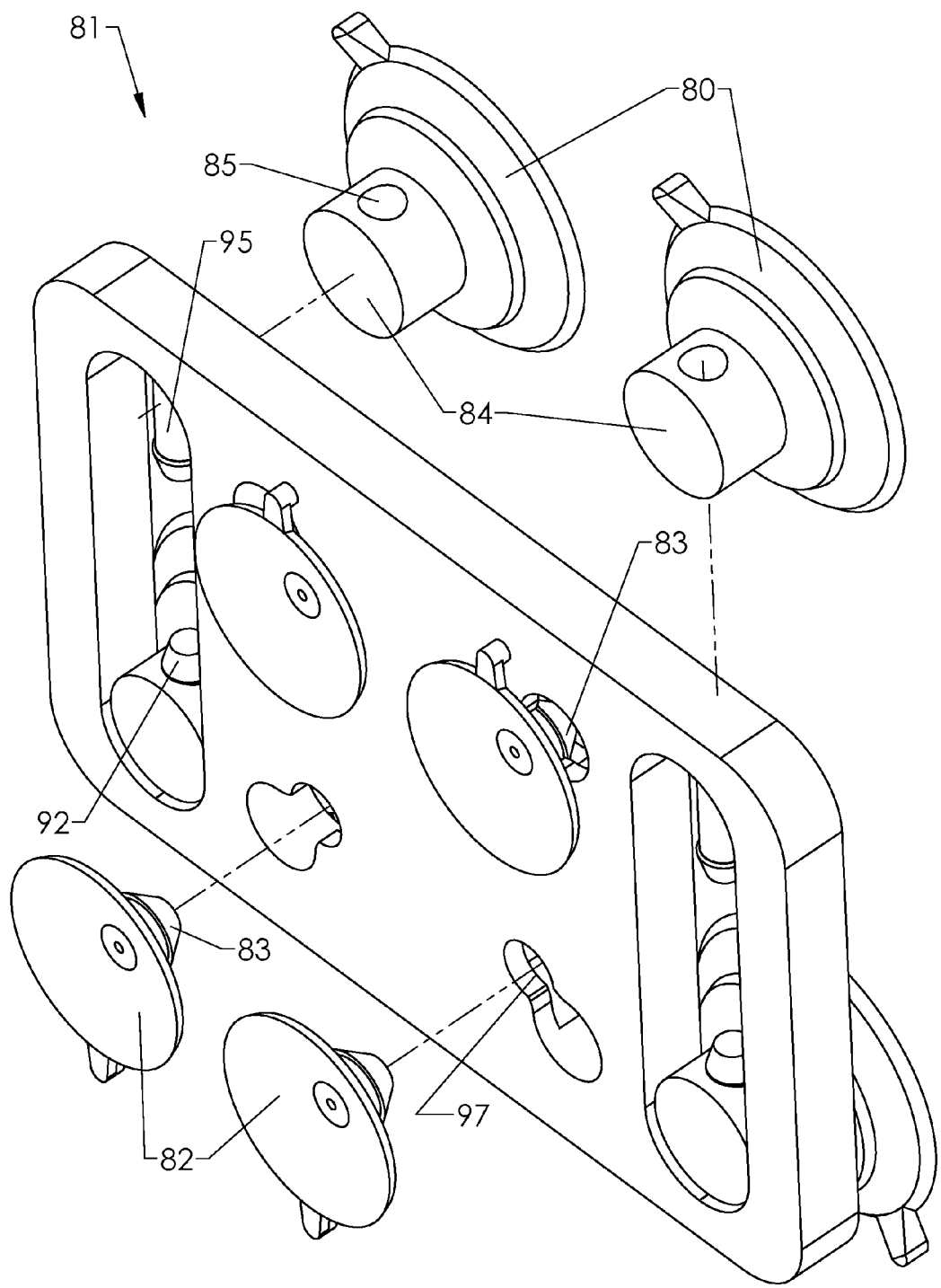
FIG. 26 is a front isometric exploded view of the smaller, less preferred rigid platform depicting two of the four mini suction cups attached at the front slots, and two of the four small suction cups with side pilot hole attached to the post slots in a rear facing orientation, while disconnected cups are depicted in their intended alignment with the corresponding slots.
Figure 27:
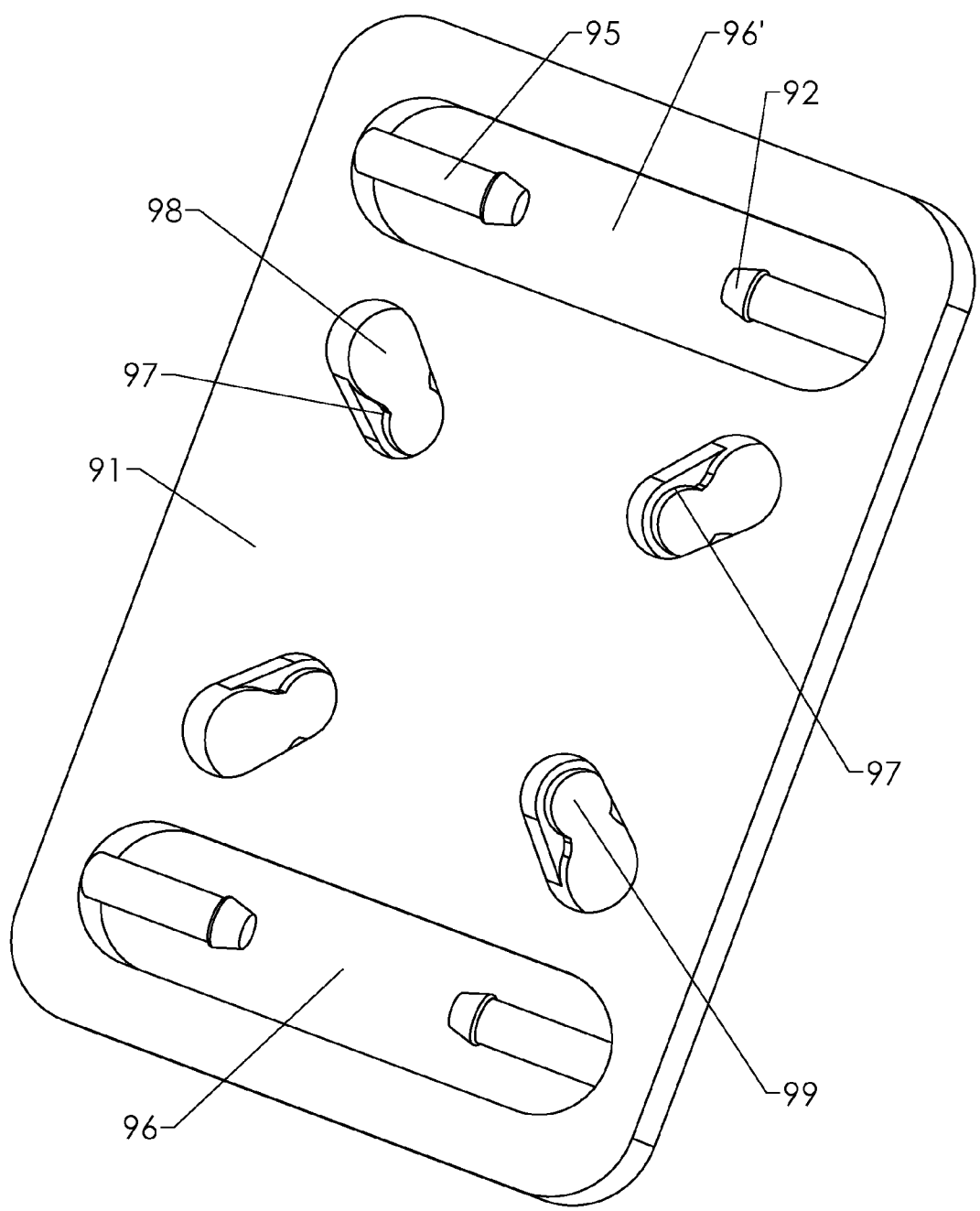
FIG. 27 is a rear isometric view of the simplified rigid platform mount depicting the four central slots for the mini suction cups and the larger slots with retention posts for attachment of suction cups with side pilot holes, being small in size.

FIG. 27 depicts a less-preferred smaller injection molded platform design as compared to the larger version shown in FIG. 3. This less-preferred orientation would still allow for the intended functionality of the device by using only four side pilot hole cups and four mini cups, although does so by providing a lesser amount of holding force due to the reduced number of cups, which is still sufficient to securely hold a range of devices. As previously described, the present invention would not have to include each and every design feature outlined, and could therefore optionally include only one or more of the various design features. As an example of this, a depiction of a simplified smaller platform has been provided, integrating only the suction cups slots, and not including the cording slots, or the kickstand assembly/slots. The platform mount 91 depicted in FIG. 27 contains 2 open slots 96, 96' each with 2 retention posts 95 for insertion of suction cups with side pilot holes. FIG. 27 depicts a rear isometric view of the platform mount with the four retention posts 95 depicted, each with a mushroom tip 92 to keep the suction cup held in place. This attachment connection is shown in FIG. 26 where the suction cup is held in place via the mushroom tip 92. This mushroom tip mechanism is preferably of a diameter that is not too large to restrict the post/tip 92, 95 from being inserted completely through the side pilot hole 85. Due to the material qualities of the preferred cups 80, some stretching and flexibility is apparent which allows the post/tip 92, 95 to be maneuvered through the side pilot hole, but is not easily removed. The slots are designed to accommodate a suction cup 80 as depicted in FIG. 26, with side pilot hole 85 opening as shown.

Figure 25:
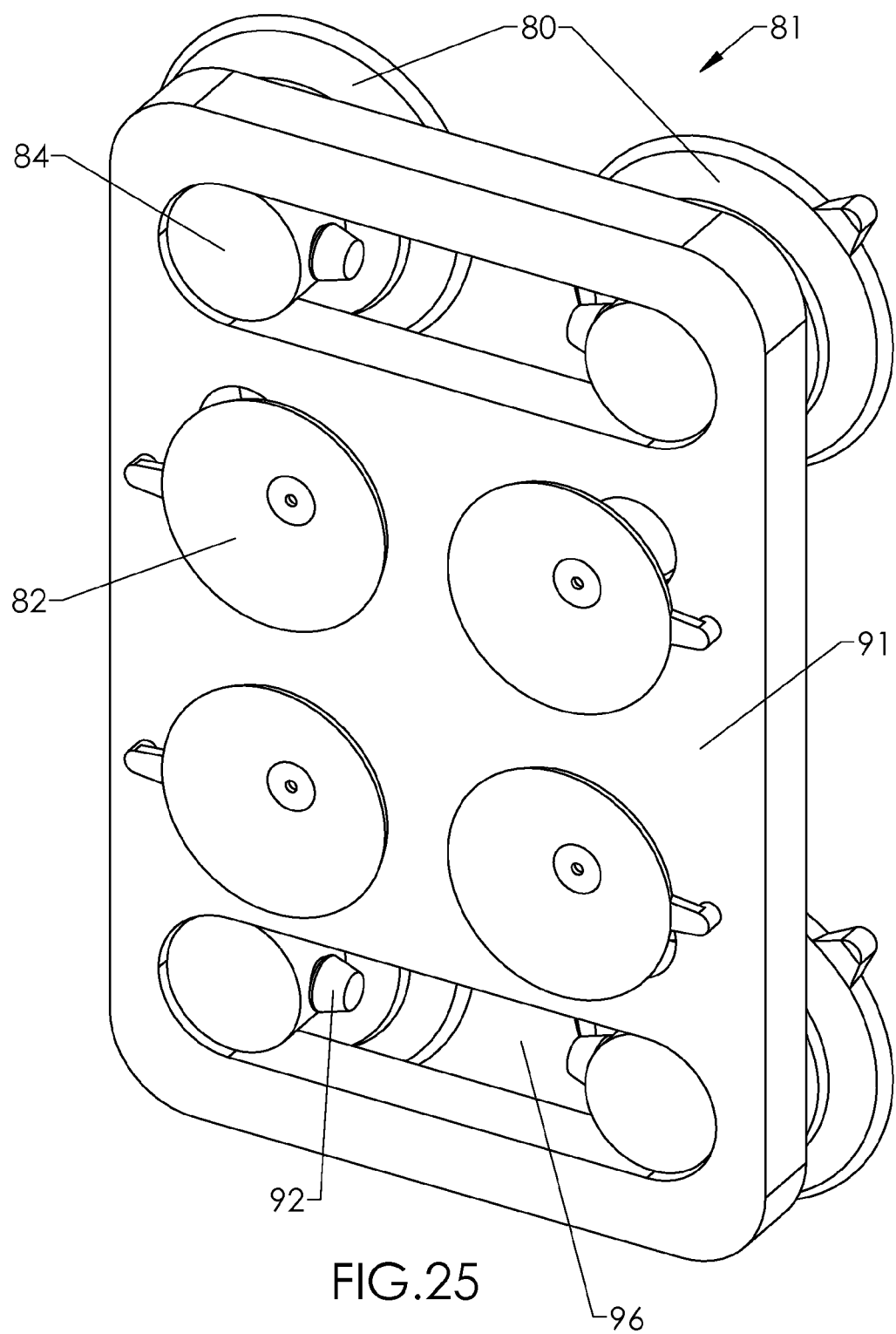
FIG. 25 is a front isometric view of the smaller, less preferred rigid platform depicting four mini suction cups attached at the front slots, and four small suction cups with side pilot hole attached to the post slots in a rear facing orientation.

FIG. 25 depicts a front isometric view of the assembled device 81, wherein the platform mount 91 with small side pilot hole suction cups 80 are facing to the back, securely held in place by insertion into slot 96, pushed onto the attachment post and held in place via the mushroom tip 92. The ovular-shaped elongated suction cup slots 96 of the platform 91 are best shown here with the suction cup units 80 depicted with the preferred orientation passing through suction cup slots 96, over the mushroom tip 92, and onto the post arms (not shown). The cups 80 are oriented rearward in this figure to be attached to a smooth surface, while the smaller cups 85 are oriented forwards to be attached to the smooth glass screen surface of an electronic device. The rounded portions of the slot 96 create the spaces, discussed above, in which the suction cup knob 84 is captured and held in place as shown in FIG. 25. Said capturing is sufficiently tight/close to limit unwanted shaking or other movement of the suction cups 80 relative to the mount platform main body 91 for maintaining the preferred orientation, and the tight fit against smooth surfaces for proper suction.

FIG. 27 identifies a smaller suction cup slot 98 designed for a mini cup that extends forward rather than back as these mini thick neck cups (FIGS. 26-82) are designed for suction/retention directly to an electronic device. These smaller slots have a large opening 98, and smaller opening 99 to allow the mini suction cups with mushroom head to be inserted into this larger slot 98, then pushed/forced into the smaller slot 99. The smaller slot opening 99 contains a semi-circle lip protrusion 97 that extends into the space between the mini suction cup 82 and the thick neck 83 to create a tight fit as depicted in FIG. 26. This partially exploded view of the device clearly depicts the intended locations of the suction cups 80 and 82, showing two of each type of cup attached to the mount in the preferred orientation. The small side pilot hole cups 80 are attached to the post 95 and held in place via the mushroom tip 92. The mini suction cups 82 are shown aligned with the preferred slot, with cup 82 shown inserted into the slot and held tightly in place via the lip protrusion 97 which fits tightly into the gap opening between the outwards facing cup and the thick neck mushroom head 83. For example, the radius of the main portion (rounded portion) of the preferred slot 99 may be equal to (and more preferably 2-5 percent smaller) than the radius of the central portion of the thick neck 83. This way, as described above, the thick neck 83 portion of the suction cup unit 82 may be pushed into the slot 99 with the central radius of the thick neck 83 portion to be pinched/squeezed to maintain a tight fit between the slot lip 97 and the thick neck mushroom head 83 of the mini suction cup unit 82. This way, the suction cup 82 will not easily slide through the slot's smaller hole 99 diameter. Once properly inserted, the close fit of the rounded (circular, non-enlarged) portion 83 with the mushroom head portion pressing against the rear portion of the slot 99 while encircled by the lip portion 97 of the slot prevents the cup from sliding out or being pulled from the slot by the forces of normal use, because the cup perimeter is blocked from sliding out of the hole by the connection of the thick neck mushroom head 83 and surface 97 around the slot opening 99, and the forces of normal use will not tend to squeeze or pinch the thick neck 83 to an extent wherein it would pull out of the slot.

Figure 21:
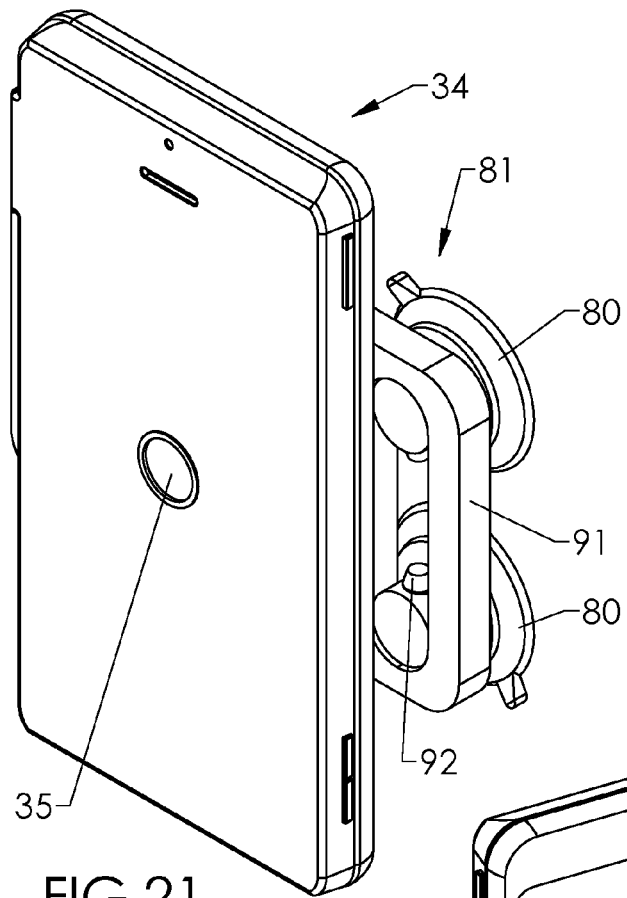
FIG. 21 is a front isometric view of the a smaller, less preferred version of the rigid platform with only four attached medium suction cups within the slots, wherein the medium cups are attached to a smooth surface, while the four mini suction cups at the front of the platform secure a smartphone device in portrait orientation.
Figure 22:
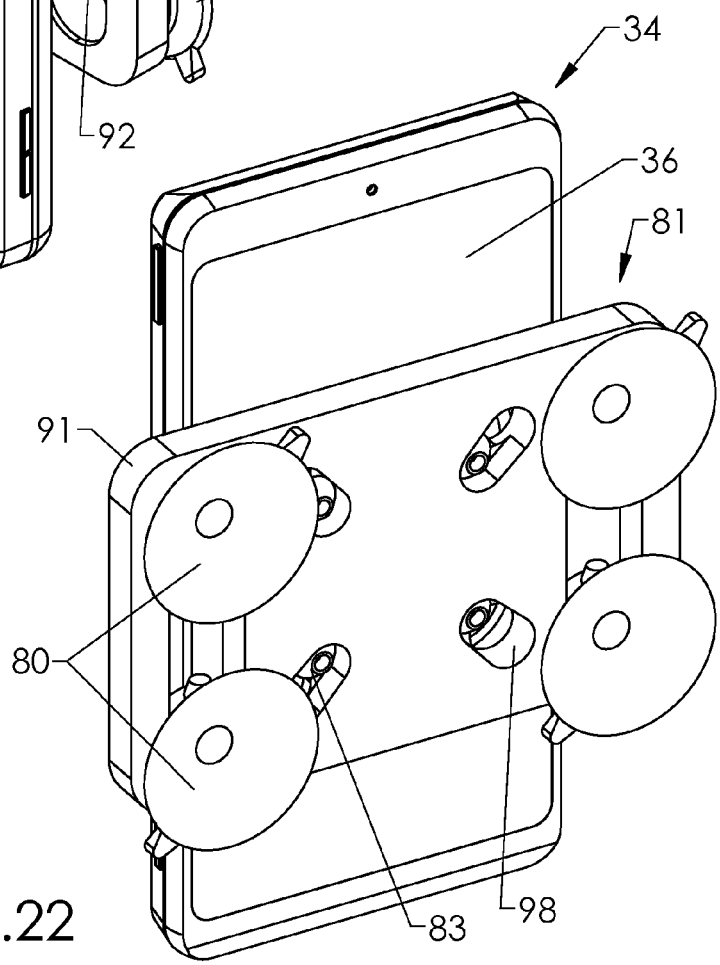
FIG. 22 is a rear view of the embodiment depicted in FIG. 21.

As shown in FIG. 21, this dual suction cup design on the mount platform 91 provides stronger cups 45 at the rear, which affix to a flat smooth surface, while the mini cups 82 (not shown) attach to the screen of an electronic device 34 allowing the camera lens 35 to be exposed. FIG. 22 depicts a rear isometric view of the embodiment of FIG. 21, best showing the thick neck 83 of the mini suction cup tightly secured in the slot 99. The larger portion of the slot opening 98 is also shown here, allowing an opening at which to initially extend the mushroom head 83 portion into before pushing it into place. The four mini suction cups attached to the mount 91 are facing outwards to allow attachment to the screen 36 of the electronic device in a portrait orientation. FIG. 23 depicts a front isometric view of the assembled device 81, where in the platform mount 91 is aligned vertically while attached to a smooth surface 87 with electronic device 34 attached to the mini suction cups at the front of the mount 91, allowing the camera lens 35 to be exposed for use. As is best shown in FIG. 24, the device 81 contains the platform mount 91 with rear facing suction cups 45 attached to a smooth vertical surface 87 while mini suction cups 82 are attached to the screen 36 of an electronic device 34. The device 34 can therefore be easily removed from the mini cups 82 due to their weaker suction strength, allowing the platform 91 and small side pilot hole cups 80 to remain attached to the surface 87. As shown in FIG. 24, it is understood that the interior space within the suction cups 82 and the screen 36 of the device 34, the inherent resilience of the cup creates a vacuum/suction connection between the surface 36 of the cups 82 and the screen 36, thereby allowing for a tightly-held connection. A similar connection is made between the sups 80 and smooth surface 87.

The preferred removal process entails a user to place multiple fingers into the gap 69 between the device 34 and the smooth surface 87, then securely pressing the finger tips onto the screen 36 of the device 34 and applying an outward force away from the surface 87, allowing the device 34 to be easily removed from the suction cups 82 and mount 91. While the smaller sized mount platform 91 is shown to contain four attachment points for each cup type/design 80, 82, a lesser number could be conceived as an alternative to what is depicted, but it is preferred that the mount contain at least 2 or more of each suction cup type. The number of suction cups on the device could therefore vary from 2-8, or more depending on the relative size of the device and corresponding suction cups. Ideally, a platform mount with more than 2 cups provides some stabilization and does not allow the platform to tilt, and therefore disrupt the desired field of view for the camera lens, which is preferably perpendicular to the smooth surface to which it is attached.

FIG. 21 illustrates a front isometric view of the device 81 depicting an electronic device 34 suspended from the mount 91 in portrait orientation with camera lens 35 exposed for use. The mount platform 91 is not clearly shown in FIG. 21 and only a small portion of the main body 91 and suction cup units 80 is shown along the edge of the electronic device, as the apparatus is generally hidden behind the device 34. FIG. 22 more clearly depicts the desired orientation of the device screen 36 relative to the mount main body 91. In this case, the longitudinal axis of the device 34 is preferably oriented perpendicular to the longitudinal axis of the mount platform body 91, but located centrally in line with the center point of both the device 34 and platform 91. This preferred central orientation allows the screen 36 of the device to be centrally located, thereby providing the sufficient screen 36 area at which to attach the mini suction cups 82. Alternatively, the device can be rotated by 90 degrees to allow attachment in a landscape orientation, where the vertical centerline of the device 34 would then be in line with the horizontal centerline of the mount 91, thus both the device 34 and the mount platform 91 are parallel to each other along their longitudinal axis.

General Descriptions of Preferred Features of Certain Embodiments

The preferred multi-purpose suction cup mounting apparatus allows for self-photos, allowing the user to set a timer (or alternative shutter feature), suspend the device and take a self-photo/video, rather than holding onto the device or pointing the device into a mirror to capture the photo. The preferred embodiments effectively allow a user to place/affix his/her electronic device onto to outward facing side of the mount and suction cups (generally small or mini cups), secure it in place, and affix the rearward facing side of the suction cups (generally small or medium side pilot hole cups) to smooth surfaces to allow for easier self-picture taking, or videos. Primary problems with much of the prior art includes: large size, expensive manufacturing process, bulkiness, inconvenience in transportation, limited use to one type of electronic device, etc. The preferred multi-purpose mounting apparatus solves these issues in that is it small, lightweight, and has the ability for use with an array of modern day devices. The modern day smartphone and tablet devices are already being carried by a high percentage of the population, creating additional convenience when desiring to take a photo/video. The preferred apparatus can be attached via suction cups, which are understood by most people, to a variety of smooth vertical surfaces (or smooth objects such as an automobile), and is very inexpensive to manufacture.

With the development of information communication technology, cellular phones have become essential tools of modern life. More recently, the cellular phone is provided with various functions, such as a camera, in addition to a function of simply calling or answering the telephone. The integrated camera has a variety of functions including photo and video recording. In addition, various smartphones and tablets have applications (known as "Apps") that allow a user to take photos using self-timers. These self-timers can be initiated either utilizing a preset time, motion sensor, or can be initiated by sound, such as a clapping noise or voice command. Alternatively, blue tooth enabled remote controls are becoming available to allow users to remotely control the shutter function, thereby providing more control when taking self-photos which is seemingly superior to alternative timer applications. Regardless, either format could be utilized for taking photos. Designs widely vary, however nearly all modern day smartphones, e-readers, and tablets include a flat LCD touch screen, which the inventor has discovered can serve as a location at which to attach small suction cups. Additionally, many of these hard shell casings of such smartphones, tablets and e-readers comprise a smooth hard surface, which can therefore act as an additional attachment location for multiple suction cups, to allow screen viewing. Thus, the cellular phone and tablets are recognized as advanced video-recording equipment, going beyond the functionality of a traditional camera used solely for picture taking purposes.

With the advancement of cell phone and tablet technology and increasing demand for photo and video functionality, the inventor believes that there is a need for a multi-purpose, convenient, and inexpensive mounting apparatus that allows for hands-free pictures/video, and that is operational with a wide variety of electronic devices. There is a need for such a mounting apparatus that uses an easy-to-use and long-lived mounting mechanism, such as the preferred suction cups, that is operable with most present day smartphones, tablets, e-readers, and other similar electronic devices.

Household devices for affixing cameras or cell phone devices have been envisioned, but have not been constructed to allow for multi-purpose use such as serving as a mount platform providing a solution as an accessory for picture-taking from a variety of smooth vertical surfaces or structures to be operated with a broad array of devices. In addition, the preferred multi-purpose mount would also contain the capability to attach to objects via retention strap or cording material, such as a passenger seat. This unique combination of functions has not previously been observed. Typically, tripods are constructed for and function to merely provide a stable object to affix a camera device, to allow for placement on a flat surface such as a floor or table top, or level topography such as the ground, roadway, or rock surface. The inventor believes that the major problems with traditional apparatus arise in transporting a tripod on one's person, in a vehicle, in a suitcase, or in a backpack etc. A secondary problem is associated with a tri-pod's limited capability for use on vertical surfaces both outdoors and indoors. While a tripod can effectively be used in some circumstances, the convenience of such an apparatus is not conducive to everyday use.

Referring specifically to the multi-purpose, suction cup mounting apparatus of the drawings, the apparatus preferably comprises a rigid platform, the main body of which may include two distinct halves or outer sides, for example, two sides with open space adjacent to each outer side for provision of mounting systems at the front and back of the rigid platform. While is it preferred that the mounting systems are suction cups connected or fixed to the mount, it will be understood that other mounting systems such as hooks could possibly be used in certain embodiments. The preferred rigid platform comprises multiple suction cup retention holes and multiple suction cup retention posts, but it will be understood from this disclosure that one hole may be provided in/on the mount platform, and "one or more hole" could be used. Said one or more suction cup retention holes created in the main body and/or otherwise provided as a portion(s) of the platform itself. The general shape of the holes/slots for the side pilot hole style cup units are preferably generally ovular with two rounded sides and elongated middle section with retention post extending outwards from one side of the ovular opening and the other side being open, however, other elongated hole shapes may be provided in certain embodiments, for example, oblong, egg-shaped and possibly even elongated rectangle. Less-preferably, non-elongated hole shapes may be used, such as square or circular. A particularly-preferred suction cup system for these slots utilizes what may be called "side pilot hole suction cups" or, in other words, units that each have a forward-facing suction cup and a rearward-protruding knob with side pilot hole. By connecting a knob region of the suction-cup unit (a region behind the facing cups) to the rigid platform via retention post and allowing the oppositely-facing cups to protrude out away from the platform in their forward direction, suction cup (vacuum connection) capability is provided in a convenient, compact, and interesting and/or stylish way.

It has become commonplace that a higher percentage of citizens of nearly all ages own a modern day smartphone and carry it on their person on a day to day basis. Thus, the modern day smartphone has become the most common electronic device known to be carried by a high percentage of the population. Often a person may unexpectedly desire to take a self-photo while at an event, or at some point in their day to day activities. Thus, the modern day smartphone is the most convenient device that would be expected to be used for such video recording purposes. The preferred multi-purpose, smooth surface and strap/cording capable mounting apparatus effectively creates more attachment options due to the fact that the mount contains such a wide variety of attachment methods and is also operable with a relatively diverse spectrum of electronic devices. Additionally, the device can be easily carried on one's person, in a purse, back pack or other means, due to the small lightweight nature of the design, foldable kickstand, and associated materials. Additional convenience is created by the fact that the device will work with a high percentage of smartphone and tablet designs, thereby allowing the user to operate the device with their current electronic device model, or a different model that they may obtain in the future.

The inventor has created an effective way of mounting a smartphone, tablet, or other touch screen electronic devices on a smooth surface allowing for self-photos and videos, or hands-free screen viewing while suspended on a generally vertical surface or object via suction cups. In addition to this mounting function, the invention may in certain embodiments serve the additional functions associated with hand-free screen viewing, for example, by attaching the kickstand assembly, the retention strap assembly, cording assembly, or mounting directly to a surface using traditional screw mechanisms. Thus, the preferred platform mount contains a broad array of attachment methods to accomplish hands free screen viewing, or photo/video functions.

The preferred plastic injection material is preferably firm, for example, rigid, so that the various features of the main body do not break, or bend. The firm exterior or entire body of the mount keeps the electronic device pointing in the desired and predictable direction for proper pointing at the subject of the photo/video, rather than twisting out of the desired field of view, or plane.

In certain embodiments, the platform mount comprises generally ovular shaped apertures/slots/holes to allow a cup of a side pilot hole suction cup unit to be inserted and pushed onto retention post arm within the slot, so that the cup unit is retained in place within the slots, being interchangeable in direction to allow the cup to either be facing out from the front side of the mount or facing to rear opposing side of the mount. A major portion of each large slot is preferably only slightly wider than the central region of the main body of the suction cup knob, but a mushroom tip and arm post portion of each slot allows the preferred side pilot hole cup to be inserted and removed conveniently when desired. The slot openings serve the function of securing the suction cups to the mount platform, retaining them during use so as not to allow them to be easily removed from the mount. A circular shape creates some ease in inserting the preferred suction cups into the slots. The inventor has found that the shape that best allows the cups to be inserted, and yet retained in place for use, is the ovular shape with half circles at each side of the slot. Such a shape allows one side of the cup to be inserted at the widest part of the slot, while the side pilot hole portion of the cup can then be pressed/pushed onto the post arm to fit allowing the mushroom tip to be pushed through the narrow side pilot hole and completely through to the opposing side of the cup knob. This is because, when the mushroom tip portion of the post arm is pushed into the hole, the hole will slightly stretch to allow the tip to push through the hole but the larger tip is therefore not easily pulled through due to the mushroom tip being restricted by the suction cup side pilot hole diameter being slightly smaller. The tip is angled so that the leading portion of the mushroom tip and arm post is more easily-inserted through the hole but is not as easily removed, although can be removed by applying force and maneuvering the cup off of the retention post arm and mushroom tip.

Alternatively, the retention slots may be of a different shape compared to those shown in the drawings. For example, other elongated shapes, for example, oblong, or egg-shaped may work similarly to an ovular shape in certain embodiments. When the suction cups are attached correctly, the open cup portion of the units are directed outwards from the mount platform, but not coming into contact with the other cups either when relaxed at rest or compressed to form suction inside the interior space of the cup. This attachment method is desirable as it results in the connected part of the suction cups to be exposed for attachment to a smooth surface, thereby serving as the mechanism(s) to securely hold a device in place.

In certain embodiments, the platform mount comprises generally circular shaped apertures/slots/holes to allow a cup of a mini thick neck suction cup unit to be inserted and pushed into the small circular slot, so that the cup unit is retained in place within the slots, in direction to allow the cup to be facing out from the front side of the mount. A major portion of each of these smaller slots is preferably only slightly smaller in diameter than the central region of the main body of the suction cup knob (neck), and the thick neck mushroom tip portion of cup allows the preferred cup to be inserted and removed conveniently when desired. The slot openings serve the function of securing the mini thick neck suction cups to the mount platform, retaining them during use so as not to allow them to be easily removed from the mount. A circular shape creates some ease in inserting the preferred suction cups into the slots. The inventor has found that the shape that best allows the cups to be inserted, and yet retained in place for use, is the circular shape with one larger circle intersecting a smaller circle. The thickness of the slot corresponds to the distance from the mushroom head portion of the thick neck to the back of the cup itself, thereby allowing the thickness of the mount to slot into the gap portion of the mini thick neck cup unit. Such a thickness and circular shape allows thick neck portion of the cup to be inserted at the widest part of the slot, after which the neck portion of the cup can then be pressed/pushed into the smaller circular portion of the slot allowing the mushroom head portion of the thick neck to push against and connect with the back side of the mount surface. This is because, when the mushroom head portion of the suction cup is pushed into the hole, the neck of the suction cup will slightly compress/augment to allow the neck to push into the small gap opening leading into the smaller hole but the larger neck is therefore not easily pulled through due to the mushroom head being tightly resting against the back side of the mount therefore restricted from being pulled through the slot due to the larger diameter of the mushroom head when compared to the circular slot opening. The gap leading into the smaller portion of this slot is angled so that the leading portion of the neck is forcefully compressed to a smaller thickness when pushed into this gap, but then expands back to its circular shape when forced into the small circular slot opening, but is not as easily removed due to the narrower width of the small gap opening. The mini thick neck cup units can be removed by applying force and maneuvering the cup back through the gap and out of the slot.

While preferred platform mount contains ten post-slots for side pilot hole suction cups and 7 smaller circular slots for mini thick neck suction cups as the preferred number of cups, it may be understood that the preferred number can be altered to include less of each cup slot (2-5), or more cups (10-12), for example. This less preferred mount design was shown in various drawings to contain only four mini thick neck cups and four small side pilot hole cups. The mini thick neck suction cups are the preferred quick-connect/disconnect fasteners, designed with a rear mushroom head region to allow the cups to be retained within the smaller circular slots as described herein. In addition, small to medium sized cups with side pilot holes within the knob of the cups is the preferred suction cup design to be operable with the larger retention arm-mushroom tip slots.

The main body of the platform may be described as having circular post features integrated onto all four sides of the main body which create a slot opening between the main body and the cylindrical posts. The circular post features serve as a location for the attachment of the kickstand assembly via snap openings at the ends of the rotatable kickstand assembly comprising a short and long leg. The suction cup slots are preferably located so that they do not restrict the use of the kickstand assembly, and there remains to be sufficient slots on the mount so as to attach a sufficient number of suction cups while still allowing the kickstand assembly to be attached to obtain the desired multi-functional device.

The preferred materials described herein are available through conventional commerce. The mini thick-neck mushroom head suction cups and side pilot hole suction cups (small, medium, and large) can be purchased at stores, or online directly from manufacturers. In addition, there are a variety of manufacturers and dealers of such materials online, which allows for bulk purchasing of such materials.

As used herein, the term "tightly", when used regarding a suction cup connection to a surface, refers to a fit including direct physical contact and air-sealing between at least a majority of cup surface and the surface/object surface, the contact and air-sealing being sufficient to create sufficient and sustained (for a desired amount of time, such as 2-5 minutes or more) vacuum/suction inside the interior of the suction cup. For proper use of the suction cups, the "sufficient" amount of suction is that maintaining placement of the cups supporting the weight of an electronic device to reliably counteract gravity, but is preferably relatively easy to overcome by purposeful user manipulation (as with attaching and removing the electronic device).

As used herein, directional-based descriptive terms, such as "front," "back," "side," "top," "bottom," and the like are used for ease of discussion. Such use is not to be interpreted as requiring use only in such direction or orientation, but only that these directional descriptors help the writer to describe elements of the embodiments relative to each other, and to describe the elements relative to example (but not necessarily all) electronic devices, and the card and cups themselves.

The preferred embodiments reduce the size of the electronic device holding apparatus, provides a unique dual orientation capability (portrait & landscape), as well as providing more flexibility of picture taking locations. As used herein, the terms portrait and landscape refer to the page orientation of the camera/device as being vertical or horizontal. Page orientation is the way in which a rectangular page, or photograph, is oriented for normal viewing, in this case referenced as a vertical orientation of a rectangular shaped device. The two most common types of orientation are portrait and landscape. The specific word definition comes from the fact that a close-up portrait of a person's face and upper body is more fitting for a canvas or photo where the height of the display area is greater than the width. Landscape originally described artistic outdoor scenes where a wide view area is needed, but the upper part of the photo would be mostly sky and so is omitted. In this case, landscape is referred to as a horizontal orientation of a rectangular shaped electronic device (long dimension of the device being horizontal).

Certain embodiments may be described as a multiple-function device, for example, a device that is a mounting apparatus for use with an electronic device having camera and/or video capability that allows hands free pictures and video, or a mount allowing an orientation which allows hands free screen viewing while the device is removably attached to the mount via suction cups. The multi-purpose mount may have multiple suction cup slots in a variety of orientations and configurations, each interior slot opening for receiving the appropriate suction cup style; and wherein the mount feature may comprising the presence on an optionally included kickstand. The mount platform may be rigid, with the removably attached suction-cups having cups attached to the front of the mount platform to connect to an electronic device, and also cups on the other side of the mount platform open and available for suction-connection to a smooth object/surface, in order to hang/suspend the device and electronic device from said object/surface. The number of suction cups both at the front and rear can be modified as necessary depending on the size of the device, or intended duration that the mount is expected to be held in place. The preferred larger platform design would allow for attachment of a maximum of 10 suction cups with side pilot hole, while the smaller, less preferred platform version of the design would allow for a maximum of four such cups. The number of slots could be modified, or lower quantities of suction cups can be utilized as deemed necessary. The preferred method is to attach six suction cups at the slots along the outer regions of the platform, so as to allow access to the release tabs that are typically located on the preferred suction cup design. The preferred larger platform design would allow for attachment of a up to 7 mini thick-neck mushroom head suction cups, but a lesser quantity is preferred, typically only requiring three to four such cups for use depending on the size of the device.

The suction cups are outward facing from the mount platform with the ability to suction/attach to smooth surfaces. The suction cups may be manually inserted into the appropriate slots to remain in place during the use of the mount, and, hence, are also manually removable if the user or a manufacturer desires. The mount platform may contain sufficient space to allow integration of the various additional features, or attachment options that would allow for alternative connection methods to objects or surfaces. Certain embodiments may be called a rigid mount platform with slot openings and post arms for receiving side pilot hole style suction cups, also with smaller slot openings that are generally circular in shape, for receiving the mini thick-neck mushroom head suction cups. The uniquely shaped slots (or other elongated slots in certain embodiments) are preferably of a specific size to ensure secure retention of the suction cups during use and keep them in place.

Certain embodiments may be described as an electronic-device suspension system, the system comprising: an elongated hand-held electronic device having a length, a flat smooth touch-screen, and a lens near one end or otherwise provided on a side of the electronic device for taking pictures or video recording; a mount having a rigid platform, the platform having a longitudinal axis with a variety of slots, some of which are sized to receive multiple suction cups to be oriented to the front and rear, that can removably attach to an electronic device in a horizontal orientation parallel to the longitudinal axis, or removably attach to the electronic device in a vertical orientation perpendicular to the platform so that the electronic device is in portrait configuration. The multiple suction cups slots are preferably oriented in a variety of locations within the mounting platform, created via injection molding methods. The multiple suction cups (either side pilot hole and/or thick-neck mushroom head) are preferably securely inserted into the slots, the smaller cups at the front of the mount being for receiving the screen/back side of an electronic device and the cups at the rear of the platform being exposed for removably attaching to a smooth vertical surface or object. By connecting the suction cups to the screen of the electronic device, the more powerful lens, which is typically on an opposite side (non-screen side) of the electronic device, will be exposed for hands-free use while the suspension system holds the electronic device on the vertical surface or object.

By their nature, camera devices (especially portable electronic devices with video functions) are meant to be utilized by an individual taking video of gatherings, events, celebrations, or day to day activities. A problem arises when an individual desires to actually be in the photo or video while it is being taken in a particular setting, or during an event. This situation often occurs with portable devices, such as wireless or cellular telephones with video recording functions, where a user traditionally holds the device with one or two hands to take photos or videos of others, but leaving themself out of the pictures/videos. Such traditional methods do not allow for a person to participate in the video event, or be in the pictures. The use of the mounting platform onto a variety of surfaces and objects, thereby allows the picture taker to be included within group shots, video recordings of events, or simply self-photo occasions.

From this description and the drawings, one may understand that the electronic device may be easily secured to the suction cups facing outwards from the mounting platform and be securely retained there to achieve landscape orientation for hands-free video recording. Thus, the device is a convenient and economical apparatus for securing an electronic device from a smooth vertical surface or object for hands free video recording or picture taking. It is especially beneficial for those taking video with a smartphone, tablet, or some other type of electronic device with video capabilities whereby the apparatus enhances the quality of the experience that the user has during the video recording process, or event at which they are recording video.

The elastic retention strap may be conveniently constructed from conventional materials by conventional sewing and/or adhesive techniques. Preferably, the elastic retention strap and hook/loop fasteners are of good quality to obtain the desired effect, all existing materials being readily available through traditional sourcing methods. The intention of the mounting platform and kickstand design is to provide a customized mechanism to serve the intended purposed for the invention. These are custom injection molded items for which a mold can be created, and thus the desired part can then be manufactured from the mold. The mounting platform may be of a different size compared to those shown in the drawings, for example, the number of suction cup arms/slots can be varied, which would then result in different sizes of the platform as needed. Also, the number of kickstand attachment posts and/or slots/arms could be changed and/or the arm(s)/slot(s) could be placed differently in certain embodiments to accommodate specialty electronic devices to provide alternative locations for the kickstand to attach. It may be said that the mounting platform may include "at least two" sets of cylindrical attachment arms, so as to provide at least on location at which the kickstand may attach. While it is preferred that the mounting platform and kickstand assembly are both provided as shown, some less-preferred embodiments may simply provide the mounting platform without the kickstand assembly, which would still allow for a variety of functions. This was demonstrated with the smaller, less preferred, version of the suction cup mount as shown, wherein no kickstand is provided, and the size of the mounting platform is much smaller due to the decreased number of suction cup slots and lack of kickstand assembly.

The preferred mounting platform, suction cups, retention strap, cording assembly, and kickstand assembly described herein provides an array of unique attachment options. The device's ability to function with a broad spectrum of devices is accomplished in certain embodiments at least in part because the design features and specific dimensions and physical characteristics of the apparatus. There is some leeway in the overall length and width of the mounting platform; even with this leeway and variation, the apparatus will still be able to generally secure an electronic device to the apparatus via suction cup as well as a smooth object via suction cups and allow the user to record video or take pictures while the electronic device is securely retained on the device. Preferably, the kickstand assembly posts are located along the outer edges of the sides of the platform to ensure that the kickstand assembly can easily attach without conflicting with the attached suction cups. Also, adaptations may be made in certain embodiments in the level of tilt used for the kickstand that is used to provide the desired screen viewing angle of the user.

The preferred mounting apparatus for use with an electronic digital device, the mounting apparatus comprising a generally planar platform having a first side, and an opposing second side generally parallel to the first side, the platform further having a first set of apertures, wherein a retention post extends into each of the first set of apertures generally parallel to said first and second sides; and a first set of suction cups, each having a base with a side-pilot-hole and a cup portion, wherein the side-pilot-holes are received on said retention posts to connect the first set of suction cups to the platform so that the cup portions of the first set of suctions cups extend out away from the first side of the platform; wherein the platform further comprises a second set of apertures and wherein the mounting apparatus further comprises a second set of suction cups, each having a base and a cup portion, wherein the bases of the second set of suction cups are retained in said second set of apertures so that the cup portions of the second set of suction cups extend out away from the second side of the platform; wherein the cup portions of the first set of suction cups are larger than the cup portions of the second set of suction cups, wherein one of said first set or second set of suction cups is selected for connection to a digital device and the other of said first set or second set of suction cups is selected for connection to another object such as a smooth surface.

The preferred mounting apparatus contains a first set and second set of apertures that extend all the way through the platform. The mounting apparatus which include retention posts which each comprise a mushroom tip for holding said bases of the first set of suction cups on the retention posts. Each aperture of the second set of apertures comprises an elongated insertion-portion and a retention-portion, and the bases of the second set of suction cups are first received loosely in the elongated insertion-portions and then slid sideways into, and held tightly in, the retention-portions. The mounting apparatus further comprising a kick-stand pivotally connected to the platform and extending out from the platform to hold the platform at an angle to a generally horizontal surface. The kick-stand comprises two pivotal members that are pivotally connected to each other that pivotally connect to opposite edges of the platform. The preferred mounting apparatus comprises a pivot axle at each of said opposite edges of the platform, each pivot axle comprising two elongated member extending coaxially toward each other, and wherein the kick-stand is removably and pivotally connected to each pivot axle.

The preferred platform further comprises elongated members at two opposing edges of the platform, and the mounting apparatus further comprises an elastic retention strap connected to the elongated members, wherein the retention strap is for hanging the platform on a supporting object. The first set of apertures are ovular-shaped and the retention posts extend about half-way across the ovular-shaped apertures, so that the bases of said first set of suction cups are inserted into the ovular-shaped apertures adjacent to the retention post and then slid onto the retention post. At least three suction cups of said second set of suction cups are located at or near a center of the platform, with the bases of said at least three suction cups being within about 2 inches of each other, for suction-connection to a cell phone at the second side of the platform near said center. The platform comprises at least two cording slot openings, and the apparatus further comprises a cord connected to the platform by extending through two of said at least two cording slot openings for hanging the apparatus on an object.

The platform further comprises at least two circular finger holes, the finger holes having a diameter greater than about ¾ inches and receiving no suction cups, for a user to insert a finger(s) to pull the digital device off of the platform. The platform further comprises at least two circular screw holes each having a diameter of about ¼ inch or less for receiving a screw for fastening of the platform to a surface/object. The platform is preferably rigid, wherein the platform has an outer perimeter edge, wherein the first set of apertures comprises at least three apertures, and the second set of apertures comprises at least three apertures, and wherein all of the apertures are located inward from outer perimeter edge. The cup portions of the first set of suction cups are less easily removed from said electrical device than the second set of suction cups are removed from said another object, so the second set of suction cups let go from said another object before the first set of suction cups let go of the electrical device when the user pulls on the electronic device, so the electronic device plus the platform come off of said another object as a single unit.

The preferred mount requires a system for mounting an electronic digital device on a surface or object, the system comprising a portable electronic digital device having a lens for photography or video-recording and a touch screen for operation or viewing; and a mounting apparatus comprising: a platform having a front surface and a rear surface, the platform further having a plurality of apertures; a plurality of suction cup units each having a base and a cup portion, the suction cup units being connected to the platform by being retained in the apertures and some of the cup portions extending forward from the platform and some of the cup portions extending rearward from the platform, wherein a plurality of the rearwardly-facing cup portions are suction-connected to a surface of the electronic digital device so that the lens faces rearward away from the mounting apparatus, and the forwardly-facing cup portions are connectable to the surface or object for hands-free operation of said photography or video-recording.

At least three of the apertures are ovular-shaped and the platform comprises a retention post with mushroom tip extending into each of the at least three ovular-shaped apertures, wherein at least three of the bases of the suctions cups are mini-thick-neck bases and at least three of the apertures have a circular-shaped portion to capture said mini-thick-neck bases. Additionally, at least three of the apertures having a circular-shaped portion also each have an elongated portion, wherein the elongated portions are of sufficient length and width to loosely receive said mini-thick-neck bases prior to the bases being pushed sideways into said circular-shaped portions to be tightly captured by the circular-shaped portions. Each suction cup unit is slidable sideways in its respective aperture between a portion of the aperture wherein the base is captured in the aperture and a portion of the aperture wherein the base is free to be removed from the aperture for separation from the platform. The platform further comprises at least two circular finger holes, the finger holes having a diameter greater than about ¾ inches and receiving no suction cups in the finger holes, wherein the finger holes are for a user to insert a finger(s) to pull the digital device off of the platform.

A system for mounting apparatus for an electronic digital device on a surface or object, the system also comprising at least one attachment feature connected to the platform for attachment of the platform to an object for hands-free operation of said electronic digital device or for hands-free viewing of the touch screen, the at least one attachment feature being selected from the group consisting of: a cord, a loop, a kick-stand assembly, an elastic strap, and combinations of two or more thereof. The platform comprises at least two cylindrical posts at each of two opposing edges of the platform for snap-on attachment of the kick-stand assembly or for receiving the elastic strap. The platform comprises at least two cord slot openings located at or near corners of the platform and receiving the cord. The platform further comprises screw holes to serve as an additional attachment method to non-smooth surfaces.

The retention strap that can be optionally attached from the mounting platform may be textiles, woven or braided material, polymeric or rubber materials, or other preferably flexible and elastic material, but, most preferably, they are materials having elasticity and the capacity to maintain their integrity through conventional sewing techniques. The preferred materials are not permanently deformed from normal stretching, but return to their original shape once the stretching stress (tension) is removed. Typically, fabrics having these qualities are not translucent. Non-limiting examples of materials that can be used include synthetic rubbers such as neoprene (polychloroprene); petrochemical based or other synthetically manufactured fibrous materials such as spandex (elastane), nylon, olefin fiber, polyester fabric, rayon, and particularly combinations and blends of the noted materials with each other and with other animal, plant, mineral or synthetic based textile such as cotton. In one aspect, the flexible and elastic fabric material can include a blend including neoprene and spandex.

The mounting platform and suction cup assembly is adapted to limit relative movement between the mounting plate and the electronic device when the suction cups are attached to said device. This may also refer to the connection between the attachable retention strap and an object. As used herein, the terms "tightened" and "tightly" refer to a fit including direct physical contact between at least a majority of surfaces sufficient to create a resistance to displacement due to the frictional forces caused by said direct physical contact of the surfaces. When property used, the suction cups will securely hold a device in place, or secure the mount to an object due to the combined strength of the cups and their ability to hold for periods of time to counteract gravity. For proper use of the elastic retention strap, the amount of friction maintaining placement of an object such as a head rest in an associated strap is sufficient to reliably counteract gravity, but is preferably relatively easy to overcome by purposeful user manipulation (as with inserting and removing the object by loosening or tightening the strap).

As used herein, directional-based descriptive terms, such as "front," "back," "side," "top," "bottom," and the like are used for ease of discussion. Such use is not to be interpreted as requiring use only in such direction or orientation, but only that these directional descriptors help the writer to describe elements of the embodiments relative to each other, and to describe the elements relative to example (but not necessarily all) electronic devices.

An e-reader (electronic reader) is a device for reading content, such as e-books, newspapers and documents. A standalone e-reader typically has wireless connectivity for downloading content and conducting other Web-based tasks. Popular dedicated e-readers include Amazon's Kindle and Sony Reader.

A tablet PC is a wireless, portable personal computer with a touch screen interface. The tablet form factor is typically smaller than a notebook computer but larger than a smartphone. The most common type of tablet is the slate style, like Apple's iPad or Microsoft's Surface. These devices, which are what that most people mean when they refer to a tablet, have electronics integrated into the touch screen unit and lack a hardware keyboard. However, external keyboards are available for slate-style tablets. Some keyboards also function as docks for the devices.

A smartphone is a mobile phone built on a mobile computing platform, with more advanced computing ability and connectivity than a feature phone. The first smartphones mainly combined the functions of a personal digital assistant (PDA) and a mobile phone or camera phone. Today's models also serve to combine the functions of portable media players, low-end compact digital cameras, pocket video cameras, and GPS navigation units. Modern smartphones typically also include high-resolution touchscreens, web browsers that can access and properly display standard web pages rather than just mobile-optimized sites, and high-speed data access via Wi-Fi and mobile broadband.

Both the strap 71 and cording material 67 are preferably flexible or at least bendable, so that they may effectively curve/wrap around an object, fold/bend upon themselves, and/or around portions of the mounting platform, and/or curve/wrap/fold/bend as needed for fitting onto the attachment posts. Some inflexibility along short lengths may be acceptable, for example, as hook-and-loop patches can reduce flexibility in their regions. A "grippy" strap could optionally be used for the retention strap as well, thereby providing some additional grip between the strap and object ensure the device does not easily slip/slide off of, or from the object.

The preferred slot/arm-systems are shown for connection both the open snapping ends of the kickstand to, as well as, the loop-ends of straps to the mounting plate, as these systems are effective and not bulky or cumbersome. These systems also provide secure connection of the straps to the mounting platform, while still allowing the straps to be removed and replaced as desired. The dual purpose nature of the slot/arm system is a unique design feature as these systems allow for attachment of either the kickstand, or the elastic retention strap.

Hook-and-loop fasteners are the preferred quick-connect/disconnect fasteners for "securing" or "latching" the retention strap in its tightened configuration. The elastic retention strap can optionally be an elastic velcro type material, which provides the loop side of the fastening system. Patch of hook fastener 72 is about 1.5" inches wide and 1.5"-2" long are secured to the same loop side of the distal end of the strap, to allow connection with the elastic loop material when folded over to face the loop side. The hook-and-loop fastener may be sewn into place or adhesively-attached, for example.

Although this invention has been described above with reference to particular means, materials and embodiments, it is to be understood that the invention is not limited to these disclosed particulars, but extends instead to all equivalents within the broad scope of the following claims.

The invention claimed is:

1. A mounting apparatus for an electronic digital device, the mounting apparatus comprising:
    a generally planar platform having a first side, and an opposing second side generally parallel to the first side, the platform further having a first set of apertures, wherein a retention post extends into each of the first set of apertures generally parallel to said first and second sides; and
    a first set of suction cups, each having a base with a side-pilot-hole and a cup portion, wherein the side-pilot-holes are received on said retention posts to connect the first set of suction cups to the platform so that the cup portions of the first set of suctions cups extend out away from the first side of the platform;
    wherein the platform further comprises a second set of apertures and wherein the mounting apparatus further comprises a second set of suction cups, each having a base and a cup portion, wherein the bases of the second set of suction cups are retained in said second set of apertures so that the cup portions of the second set of suction cups extend out away from the second side of the platform;
    wherein the cup portions of the first set of suction cups are larger than the cup portions of the second set of suction cups, wherein one of said first set or second set of suction cups is selected for connection to a digital device and the other of said first set or second set of suction cups is selected for connection to another object such as a smooth surface.

2. A mounting apparatus as in claim 1, wherein said first set and said second set of apertures extend all the way through the platform.

3. A mounting apparatus as in claim 1, wherein the retention posts each comprise a mushroom tip for holding said bases of the first set of suction cups on the retention posts.

4. A mounting apparatus as in claim 1, where each aperture of the second set of apertures comprises an elongated insertion-portion and a retention-portion, and the bases of the second set of suction cups are first received loosely in the elongated insertion-portions and then slid sideways into, and held tightly in, the retention-portions.

5. A mounting apparatus as in claim 1, further comprising a kick-stand pivotally connected to the platform and extending out from the platform to hold the platform at an angle to a generally horizontal surface.

6. A mounting apparatus as in claim 5, wherein the kickstand comprises two pivotal members that are pivotally connected to each other that pivotally connect to opposite edges of the platform.

7. A mounting apparatus as in claim 6, wherein the platform comprises a pivot axle at each of said opposite edges of the platform, each pivot axle comprising two elongated member extending coaxially toward each other, and wherein the kick-stand is removably and pivotally connected to each pivot axle.

8. A mounting apparatus as in claim 1, wherein the platform comprises elongated members at two opposing edges of the platform, and the mounting apparatus further comprises an elastic retention strap connected to the elongated members, wherein the retention strap is for hanging the platform on a supporting object.

9. A mounting apparatus as in claim 1, wherein said first set of apertures are ovular-shaped and the retention posts extend about half-way across the ovular-shaped apertures, so that the bases of said first set of suction cups are inserted into the ovular-shaped apertures adjacent to the retention post and then slid onto the retention post.

10. A mounting apparatus as in claim 1, wherein at least three suction cups of said second set of suction cups are located at or near a center of the platform, with the bases of said at least three suction cups being within about 2 inches of each other, for suction-connection to a cell phone at the second side of the platform near said center.

11. A mounting apparatus as in claim 1, wherein the platform comprises at least two cording slot openings, and the apparatus further comprises a cord connected to the platform by extending through two of said at least two cording slot openings for hanging the apparatus on an object.

12. A mounting apparatus as in claim 1, wherein the platform further comprises at least two circular finger holes, the finger holes having a diameter greater than about ¾ inches and receiving no suction cups, for a user to insert a finger(s) to pull the digital device off of the platform.

13. A mounting apparatus as in claim 12, wherein the platform further comprises at least two circular screw holes each having a diameter of about ¼ inch or less for receiving a screw for fastening of the platform to a surface/object.

14. A mounting apparatus as in claim 1, wherein the platform is rigid.

15. A mounting apparatus as in claim 1, wherein the platform has an outer perimeter edge, wherein the first set of apertures comprises at least three apertures, and the second set of apertures comprises at least three apertures, and wherein all of said apertures are located inward from said outer perimeter edge.

16. A mounting apparatus as in claim 1, wherein the cup portions of the first set of suction cups are less easily removed from said electrical device than the second set of suction cups are removed from said another object, so the second set of suction cups let go from said another object before the first set of suction cups let go of the electrical device when the user pulls on the electronic device, so the electronic device plus the platform come off of said another object as a single unit.

17. A system for mounting apparatus for an electronic digital device on a surface or object, the system comprising:
a portable electronic digital device having a lens for photography or video-recording and a touch screen for operation or viewing; and
a mounting apparatus comprising:
a platform having a front surface and a rear surface, the platform further having a plurality of apertures;
a plurality of suction cup units each having a base and a cup portion, the suction cup units being connected to the platform by being retained in the apertures and some of the cup portions extending forward from the platform and some of the cup portions extending rearward from the platform, wherein a plurality of the rearwardly-facing cup portions are suction-connected to a surface of the electronic digital device so that the lens faces rearward away from the mounting apparatus, and the forwardly-facing cup portions are connectable to the surface or object for hands-free operation of said photography or video-recording.

18. A system as in claim 17, wherein at least three of the apertures are ovular-shaped and the platform comprises a retention post with mushroom tip extending into each of the at least three ovular-shaped apertures.

19. A system as in claim 17, wherein at least three of the bases of the suctions cups are mini-thick-neck bases and at least three of the apertures have a circular-shaped portion to capture said mini-thick-neck bases.

20. A system as in claim 19, wherein said at least three of the apertures having a circular-shaped portion also each have an elongated portion, wherein the elongated portions are of sufficient length and width to loosely receive said mini-thick-neck bases prior to the bases being pushed sideways into said circular-shaped portions to be tightly captured by the circular-shaped portions.

21. A system as in claim 17, wherein each suction cup unit is slidable sideways in its respective aperture between a portion of the aperture wherein the base is captured in the aperture and a portion of the aperture wherein the base is free to be removed from the aperture for separation from the platform.

22. A system as in claim 17, wherein the platform further comprises at least two circular finger holes, the finger holes having a diameter greater than about ¾ inches and receiving no suction cups in the finger holes, wherein the finger holes are for a user to insert a finger(s) to pull the digital device off of the platform.

23. A mounting apparatus as in claim 17, wherein the platform is rigid.

24. A system for mounting apparatus for an electronic digital device on a surface or object, the system comprising:
an electronic digital device having a touch screen for operation or viewing; and
a mounting apparatus comprising:
a platform having a front surface and a rear surface, the platform further having a plurality of apertures;
a plurality of suction cup units each having a base and a cup portion, the suction cup units being connected to the platform by being retained in the apertures and some of the cup portions of extending forward from the platform to be forwardly-facing cups, and other of the cup portions extending rearward from the platform to be rearwardly-facing cups, wherein a plurality of either the forwardly-facing cups or the rearwardly-facing cups are suction-connected to a surface of the electronic digital device so that the touch screen faces outward away from the mounting apparatus; and
wherein the system further comprises at least one attachment feature connected to the platform for attachment of the platform to an object for hands-free operation of said electronic digital device or for hands-free viewing of the touch screen, the at least one attachment feature being selected from the group consisting of: a cord, a loop, a kick-stand assembly, an elastic strap, and combinations of two or more thereof.

25. A system as in claim 24, wherein the platform comprises at least two cylindrical posts at each of two opposing edges of the platform for snap-on attachment of the kick-stand assembly or for receiving the elastic strap.

26. A system as in claim 24, wherein the platform comprises at least two cord slot openings located at or near corners of the platform and receiving the cord.

27. A system as in claim 24, wherein the platform further comprises screw holes.

\* \* \* \* \*